US008200761B1

(12) United States Patent
Tevanian

(10) Patent No.: US 8,200,761 B1
(45) Date of Patent: Jun. 12, 2012

(54) METHOD AND APPARATUS FOR IMPROVING SECURITY IN A DATA PROCESSING SYSTEM

(75) Inventor: Avadis Tevanian, Los Altos Hills, CA (US)

(73) Assignee: Apple Inc., Cupertino, CA (US)

( * ) Notice: Subject to any disclaimer, the term of this patent is extended or adjusted under 35 U.S.C. 154(b) by 1081 days.

(21) Appl. No.: 10/666,571

(22) Filed: Sep. 18, 2003

(51) Int. Cl.
*G06F 15/16* (2006.01)

(52) U.S. Cl. .............................. 709/206; 726/22; 726/26

(58) Field of Classification Search .................. 709/206; 726/22, 26
See application file for complete search history.

(56) References Cited

U.S. PATENT DOCUMENTS

| 5,754,939 | A  | * | 5/1998  | Herz et al. .............. 455/3.04 |
| 5,832,208 | A  | * | 11/1998 | Chen et al. .................. 726/24 |
| 6,366,947 | B1 |   | 4/2002  | Kavner |
| 6,701,440 | B1 | * | 3/2004  | Kim et al. ................... 726/24 |
| 6,785,732 | B1 | * | 8/2004  | Bates et al. ................ 709/232 |
| 2002/0199120 | A1 | * | 12/2002 | Schmidt ..................... 713/201 |
| 2003/0088705 | A1 | * | 5/2003  | Katagishi et al. ........... 709/246 |
| 2003/0097409 | A1 | * | 5/2003  | Tsai ............................. 709/206 |
| 2004/0083270 | A1 | * | 4/2004  | Heckerman et al. ........ 709/207 |
| 2004/0177110 | A1 | * | 9/2004  | Rounthwaite et al. ...... 709/202 |
| 2004/0243926 | A1 | * | 12/2004 | Trenbeath et al. ......... 715/501.1 |
| 2005/0055569 | A1 | * | 3/2005  | Shipp ........................... 713/201 |

OTHER PUBLICATIONS

Gee, Kevin R., "Using Latent Semantic Indexing to Filter Spam" The 2003 Symposium on Applied Computing, Mar. 9-12, 2003. Whole document.*
Wilcox, Joe; "New Outlook to give spammers the boot," Nov. 1, 2002; CNET News; accessed <http://news.cnet.com/2100-1001-964166.html>, Whole Document.*
Carolyn Duffy Marsan, "Antispam help is on the way", Dec. 2, 2002; IDG Network World Inc., Network World; vol. 19, No. 48, pp. 27 and 30.

* cited by examiner

*Primary Examiner* — Thomas Dailey
(74) *Attorney, Agent, or Firm* — Blakely, Sokoloff, Taylor & Zafman LLP

(57) ABSTRACT

Methods and Apparatuses for processing data are described herein. In one aspect of the invention, an exemplary method receives data which may include an executable portion and a non-executable portion. The non-executable portion of the data may be presented to a user without rendering the executable portion. The non-executable portion of data presented may also include information regarding the executable portion (e.g., subject matter or source of the data). The executable portion of the data is rendered or executed only when a request from a user is specifically received. Other methods and apparatuses are also described.

99 Claims, 18 Drawing Sheets

HTML Heading Information .... ⌒305

<body bgcolor="000066" text="#000000" leftmargin="0" topmargin="0" marginwidth="0" marginheight="0">

<IMG SRC="http://www.junkmail.com/Pc/b.gif?e=702226872&j=5468&c=2721&h=-1635140701" WIDTH=1 HEIGHT=1> ⌒301

The rest of the HTML information .... ⌒306

METHOD AND APPARATUS FOR IMPROVING SECURITY IN A DATA PROCESSING SYSTEM

COPYRIGHT NOTICES

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. Copyright Apple Computer, Inc., 2003.

FIELD OF THE INVENTION

The present invention relates generally to data processing. More particularly, one embodiment of this invention relates to data processing using a filtering mechanism.

BACKGROUND OF THE INVENTION

As the use of computers and the Internet have proliferated, so too has the use of email or downloading through a network. Many businesses and consumers use email as a prominent means of communication. Not surprisingly, the exponential growth of the medium has also attracted the interest of commercial email advertisers. Commercial email advertisers obtain email addresses from a variety of sources, for example, from email vendors, or from commercial web sites, often without the permission of the owners of the email addresses. The email addresses may then be used to promote the products and services of the commercial email advertisers, or of the parties they represent.

The result is a deluge of unsolicited email received by hapless email users. One method to deal with unsolicited email is for a user to manually select and delete the unsolicited email. Other methods provide for recognizing a message sent in bulk to multiple recipients, and to either discard or tag the message as a possible unsolicited message. Still other methods maintain a database of addresses of known senders of unsolicited email and on receipt of the email, automatically discard those received from the known senders of unsolicited email. Still other methods use key-word filters. This method provides for scanning the subject and/or the body of the email message for some pre-determined keywords, and if detected, the message may be either discarded or tagged as suspicious.

Despite the methods described above, commercial email advertisers use ingenious methods to frustrate the efforts of email recipients. For example, to defeat the detection of bulk email, the email messages may be routed through a maze of servers so that ultimately, the message does not appear to be a bulk emailing. To defeat a system that tracks the address of known senders of unsolicited messages, the originating address of the unsolicited email may be changed often. To confuse keyword filter methods, the subject field of the email may be deceitfully titled, for example, "In response to your query". Moreover, the key-word filtering method suffers from other significant problems, for example, when trying to filter out email messages from pornographic email advertisers using the word "sex", legitimate emails that include the word "sex" (e.g. emails relating to medical or biological science) may also be eliminated.

Commercial email advertisers also use methods to verify that an email address is valid. One such method uses a "web beacon" which is a link to a remote server operated or controlled by the commercial email advertiser. The link is often a URL which includes the user's email address or a representation of that address. This link is often activated merely by rendering the email for display on a display device. Thus, if the user opens the email document (allowing it to be viewed), as the email is being rendered the link will be activated, causing a call back, through the URL containing the user's email address (or representation of that address), to the remote server. Upon receiving the call back, the remote server will make a record showing that the user's email address is valid and will transmit the data (e.g. an image) which is associated with the link back to the user's system. This often happens without the user realizing that his/her email address has been sent out (or confirmed as valid) to a commercial email advertiser. This can also happen when a user selects (e.g. "clicks") on an icon representing an unrendered image which causes a URL (containing the user's email address) to be sent to a remote server.

In addition, as "eCommerce" is getting more popular, more and more people are using the Internet to purchase goods, such as upgrading software, which may be downloaded over the Internet. However, the downloaded contents may also include viruses or Web beacons that may invade the privacy of a user. A typical way to prevent viruses is to use a virus scanning software to scan the contents downloaded. However, such virus scanning can only be performed after downloading the item. Furthermore, such virus scanning can only be performed based on a predetermined virus pattern, instead of personal information of a user.

SUMMARY OF THE DESCRIPTION

Embodiments of the present invention relate to various aspects for processing incoming data to improve security of a data processing system and/or to preserve the privacy of a user.

In one exemplary embodiment described below, a method of processing incoming data includes (a) receiving data (e.g. an email) having a first portion which can be displayed without a call or request to another system (e.g. a remote Web server) and a second portion which cannot be displayed without a call or request to another system; (b) evaluating the received data (e.g. using a latent semantic analysis on the content of the received data) to determine whether the received data appears to be unsolicited data (e.g. junk or "spam" email); (c) presenting (e.g. displaying) the first portion of the received data to a user; and (d) presenting a representation (e.g. a "?" icon) of the second portion without making the call or request if the evaluating process determines that the received data appears to be unsolicited data.

In another aspect of the invention, an exemplary method receives data which may include an executable portion and a non-executable portion. The non-executable portion of the data may be presented to a user without rendering the executable portion. The non-executable portion of data presented may also include information regarding the executable portion (e.g., subject matter or source of the data). The executable portion of the data is rendered or executed only when a request from a user is specifically received.

According to another aspect of the invention, an exemplary method further examines the incoming data received to determine whether the data meets a data criteria (e.g., junk mail or spam) based on a rating of the data and additional information may be displayed to indicate whether the data meets the data criteria. In one embodiment, the examination is performed using a latent semantic analysis of the contents of the incoming data.

Other methods and apparatuses are also described. The present invention also discloses machine readable media which may be executed by a processor to perform the above methods. Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings in which like references indicate similar elements.

FIG. 3 is an exemplary HTML document.

DETAILED DESCRIPTION

Figure 1:
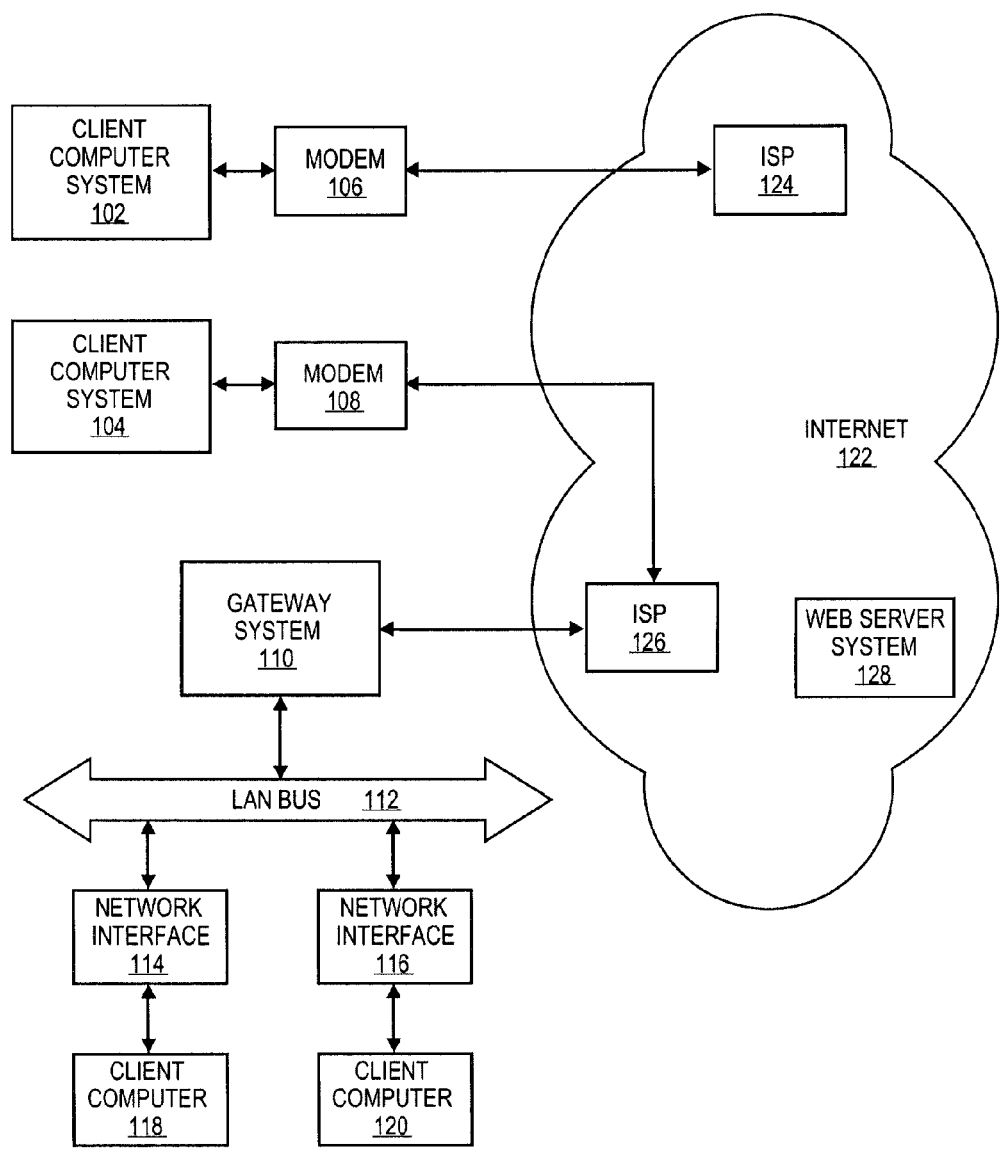
FIG. 1 is a block diagram of a network of computer systems in which incoming data may be processed, according to one embodiment of the invention.

Methods and apparatuses for data processing are described herein. Certain embodiments of the invention may be used to filter or screen for suspect content (e.g. junk email or viruses) and to display "safe" content initially and to allow a user, after reviewing the safe content, to decide whether or not to display (or otherwise present) the remainder of the content. The safe content may be any one or a combination of text or images, such as, for example, GIF images or Tiff images, that are located within the message without having to perform additional network transactions to retrieve them, or other non-executable data. Alternatively, the safe content may be anything that resides in the message without having to go back to an originator (e.g., an HTTP server) to fetch more data. The suspect content may be any one or a combination of: executable code; or URLs; or an automatically loaded link or URL; or an automatically loaded link to a URL which is different than the URL which the user addressed; or an automatically loaded link to another server which is different than the server which was addressed by the user; or a pop-up window (e.g. an advertisement in a pop-up window) which was not requested by the user; or plug-ins; or an applet; or a Java script. A content classification system, such as a latent semantic analysis (LSA) system, may be used to determine whether a document is "legitimate" or "safe" (a first class of documents" or "suspect" (a second class of documents). Then the system can automatically display all content for a document in the first class of documents and display initially only safe content for a document in the second class of documents. The system can then give the user an option to see or hear the remainder of the content for a document in the second class of documents.

According to one embodiment, when a message or a document is received at a user's machine from a remote location (e.g., downloaded from a web server or via an email server), the message or document is examined to determine whether the message or document contains an executable portion (such as a call back or request to another system for additional information e.g., a loadable image). If the message or document contains an executable portion, only the non-executable portion of the document or message is presented to the user without rendering the executable portion. In a particular embodiment, an application parses the message to identify whether the message contains a loadable image, which has resources that are located at a remote location and which are accessed through a link, such as URL (universal resource locator). The loadable image will initiate a remote call back (optionally with parameters related to the recipient's identity, such as the recipients email address) to the remote location when the loadable image is presented. If the message contains such loadable image, the loadable image is not loaded, while the rest of the information, which does not initiate a remote callback, will be presented to the user. The presented information may contain information regarding the loadable image.

In addition, according to one embodiment, the application also provides one or more options to the user to determine whether the user desires to load the image based on the information presented to the user. If the user desires to load the image, the content of the image is then downloaded from the remote location via the link and the image is presented to the user.

Furthermore, according to another embodiment, when the non-executable portion of the message is presented to the user, the message may also be rated or indicated whether the message meets a predetermined data criteria, such as junk mail or spam or an unsolicited document. In one embodiment, whether the message meets a predetermined data criteria is determined based on a content classification, such as a latent semantic analysis, of the content of the message. Further, an option is provided to the user to confirm whether the determination is appropriate. A response from the user may be used to train the system, such as a junk mail filtering system, to determine whether subsequent messages meet one or more predetermined data criteria. According to another embodiment, a configuration user interface is provided to a user to configure whether the system is operating in a training mode or an automatic mode for processing incoming messages or documents. Within the configuration user interface, the user may specify whether the system would automatically render or execute an executable portion of the message (e.g., a loadable image), or alternatively, always prompt the user whether the user desires to render or execute the executable portion of the message.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar data processing device, that manipulates and transforms data represented as physical (e.g. electronic) quantities within the computer system's registers and memories into other data similarly represented as physical quantities within the computer system memories or registers or other such information storage, transmission or display devices.

The present invention also relates to apparatuses for performing the operations described herein. An apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk or semiconductor integrated circuit including floppy disks, optical disks, CD-ROMs, and magnetic-optical disks, read-only memories (ROMs), random access memories (RAMs) such as Dynamic RAM (DRAM), EPROMs, EEPROMs, magnetic or optical cards, or any type of media suitable for storing electronic instructions, and each of the above storage components is coupled to a computer system bus.

The algorithms and displays presented herein are not inherently related to any particular computer or other apparatus. Various general purpose systems may be used with programs in accordance with the teachings herein, or it may prove convenient to construct more specialized apparatuses to perform the methods. The structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

FIG. 1 is a diagram of a network of computer systems in which a filtering mechanism may be used to filter data received over the network, according to one embodiment of the present invention. As shown in FIG. 1, a network 100 includes a number of client computer systems that are coupled together through an Internet 122. It will be appreciated that the term "Internet" refers to a network of networks. Such networks may use a variety of protocols for exchange of information, such as TCP/IP, ATM, SNA, SDI, etc. The physical connections of the Internet and the protocols and communication procedures of the Internet are well known to those in the art. It will be also appreciated that such system may be implemented in an Intranet within an organization.

Access to the Internet 122 is typically provided by Internet service providers (ISPs), such as the ISP 124, and the ISP 126. Users on client systems, such as the client computer systems 102, 104, 118, and 120, generally obtain access to the Internet through Internet service providers, such as ISPs 124 and 126. Access to the Internet may facilitate transfer of information (e.g., email, text files, media files, etc.) between two or more digital processing systems, such as the client computer systems 102, 104, 118, and 120 and/or a Web server system 128. For example, one or more of the client computer systems 102, 104, 118, and 120 and/or the Web server 128 may provide document presentations (e.g., a Web page) to another one or more of the client computer systems 102, 104, 118, and 120 and/or Web server 128. For example, in one embodiment of the invention, one or more client computer systems 102, 104, 118, and 120 may request to access a document that may be stored at a remote location, such as the Web server 128. In the case of remote storage, the data may be transferred as a file (e.g., download) and then displayed (e.g., in a window of a browser) after transferring the file. In another embodiment, the document presentation may be stored locally at the client computer systems 102, 104, 118, and/or 120. In the case of local storage, the client system may retrieve and display the document via an application, such as a word processing application without requiring a network connection.

The Web server 128 typically includes at least one computer system to operate with one or more data communication protocols, such as the protocols of the World Wide Web, and as such, is typically coupled to the Internet 122. Optionally, the Web server 128 may be part of an ISP which may provide access to the Internet and/or other network(s) for client computer systems. The client computer systems 102, 104, 118, and 120 may each, with appropriate Web browsing software, access data, such as HTML (hypertext markup language) document (e.g., Web pages), which may be provided by the Web server 128. The browsing software may incorporate a filtering mechanism, including, for example, a filtering mechanism using a content classification system, such as a latent semantic analysis (LSA), in accordance with one embodiment of the invention, to determine whether the document about to download is junk or otherwise unwanted and to allow a user to have one or more options regarding the document.

The ISP 124 provides Internet connectivity to the client computer system 102 via a modem interface 106, which may be considered a part of the client computer system 102. The client computer systems 102, 104, 118, and 120 may be a conventional data processing system, such as a Power Mac G4 or iMac computer available from Apple Computer, Inc., a "network" computer, a handheld/portable computer, a cell phone with data processing capabilities, a Web TV system, or other types of digital processing systems (e.g., a personal digital assistant (PDA)).

Similarly, the ISP 126 provides Internet connectivity for the client computer systems 102, 104, 118, and 120. However, as depicted in FIG. 1, such connectivity may vary between various client computer systems, such as the client computer systems 102, 104, 118, and 120. For example, as shown in FIG. 1, the client computer system 104 is coupled to the ISP 126 through a modem interface 108, while the client computer systems 118 and 120 are part of a local area network (LAN). The interfaces 106 and 108, shown as modems 106 and 108, respectively, may represent an analog modem, an ISDN modem, a DSL modem, a cable modem, a wireless interface, or other interface for coupling a digital processing system, such as a client computer system, to another digital processing system. The client computer systems 118 and 120 are coupled to a LAN bus 112 through network interfaces 114 and 116, respectively. The network interface 114 and 116 may be an Ethernet-type, asynchronous transfer mode (ATM), or other type of network interface. The LAN bus is also coupled to a gateway digital processing system 110, which may provide firewall and other Internet-related services for a LAN. The gateway digital processing system 110, in turn, is coupled to the ISP 126 to provide Internet connectivity to the client computer systems 118 and 120. The gateway digital processing system 110 may, for example, include a conventional server computer system. Similarly, the Web server 128 may, for example, include a conventional server computer system which includes an email server.

In one embodiment, the filtering mechanism may be implemented at a server, such as ISP 124 or 126, such that any incoming data through the server are processed using the filtering mechanism before forwarding the data to the clients, such as clients 102, 104, 118, and 120. Alternatively, the filtering mechanism may be implemented at a gateway, such as gateway 110 of a local network, such as an Intranet of an organization which may include gateway 110, LAN bus 112, and clients 118 and 120. As a result, any incoming data entering into the local network may be processed by the filtering mechanism. According to one embodiment, the filtering mechanism may be implemented at a mail server (not shown) coupled to the local area network providing email services to one or more clients, such as clients 118 and 120. As a result, any incoming emails received are processed and rendered at the mail server using the filtering mechanism. Furthermore, the filtering mechanism may be implemented at a client, such as clients 102, 104, 118, and 120. For example, the filtering mechanism may be implemented as a part of a browsing application which may be used to browse the Internet or other storages, such as storage servers or the filtering mechanism may be implemented as a part of an email application operating on a client system. In one embodiment, any data or documents downloaded by the browsing application may be processed by the filtering mechanism. As a result, the security of a system, such as clients of an ISP, a local area network, or an individual system, may be improved by employing the filtering mechanism.

Figure 2:
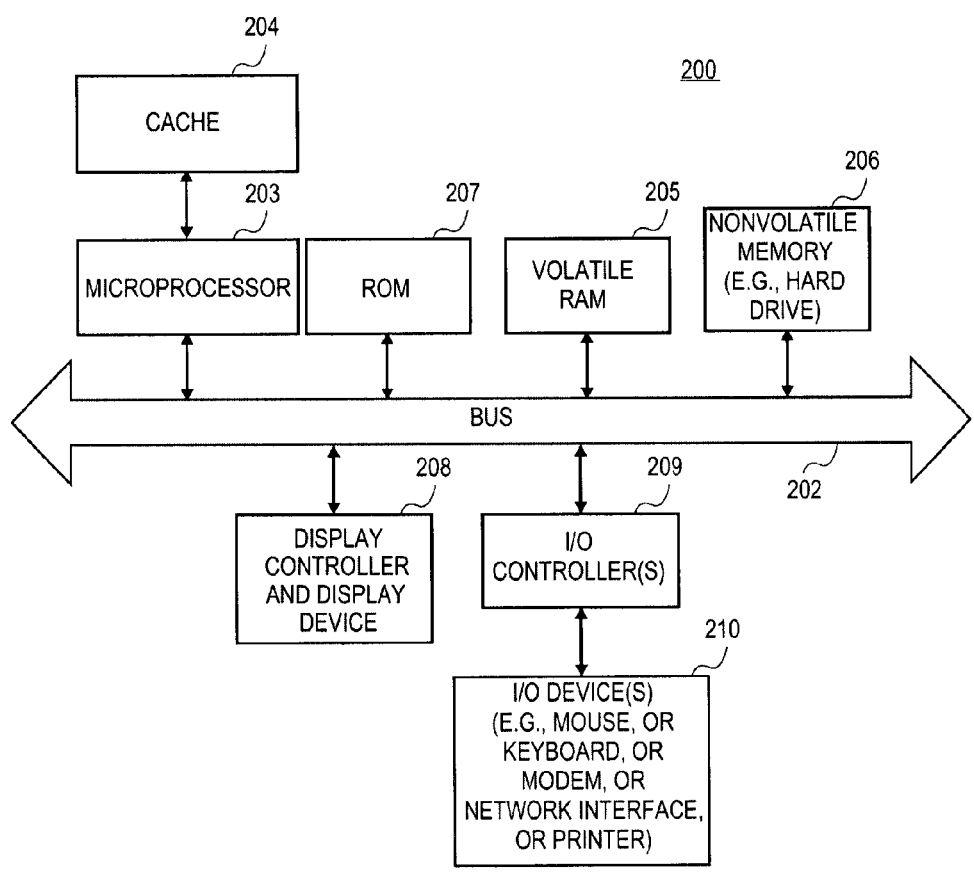
FIG. 2 is a block diagram of a digital processing system which may be used to process incoming data, in accordance with one embodiment of the invention.

FIG. 2 is a block diagram of a digital processing system which may be used with one embodiment of the invention. For example, the system 200 shown in FIG. 2 may be used as a client computer system (e.g., the client computer systems 102, 104, 118, and/or 120), a Web server system (e.g., the Web server system 128), or a conventional server system, etc. Furthermore, the digital processing system 200 may be used to perform one or more functions of an Internet service provider, such as the ISP 124 and 126.

Note that while FIG. 2 illustrates various components of a computer system, it is not intended to represent any particular architecture or manner of interconnecting the components, as such details are not germane to the present invention. It will also be appreciated that network computers, handheld computers, cell phones, and other data processing systems which have fewer components or perhaps more components may also be used with the present invention. The computer system of FIG. 2 may, for example, be an Apple Macintosh computer.

As shown in FIG. 2, the computer system 200, which is a form of a data processing system, includes a bus 202 which is coupled to a microprocessor 203 and a ROM 207, a volatile RAM 205, and a non-volatile memory 206. The microprocessor 203, which may be a PowerPC G3 or PowerPC G4 microprocessor from Motorola, Inc. or IBM, is coupled to cache memory 204 as shown in the example of FIG. 2. The bus 202 interconnects these various components together and also interconnects these components 203, 207, 205, and 206 to a display controller and display device 208, as well as to input/output (I/O) devices 210, which may be mice, keyboards, modems, network interfaces, printers, and other devices which are well-known in the art. Typically, the input/output devices 210 are coupled to the system through input/output controllers 209. The volatile RAM 205 is typically implemented as dynamic RAM (DRAM) which requires power continuously in order to refresh or maintain the data in the memory. The non-volatile memory 206 is typically a magnetic hard drive, a magnetic optical drive, an optical drive, or a DVD RAM or other type of memory system which maintains data even after power is removed from the system. Typically the non-volatile memory will also be a random access memory, although this is not required. While FIG. 2 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 202 may include one or more buses connected to each other through various bridges, controllers, and/or adapters, as is well-known in the art. In one embodiment, the I/O controller 209 includes a USB (Universal Serial Bus) adapter for controlling USB peripherals.

When a message or document, such as an HTML document (e.g. an HTML email or a web page), is delivered to a recipient, the sender of the document may include a loadable image within the document. Typically, the contents of the loadable image, also referred to as a resource or Web resource of the image, are located at the sender's remote facility (e.g., sender's server over the Internet). The document includes a link, such as a hypertext link or a URL link, linking the document with the sender's facility. When the document is presented to the recipient, a portion of the document corresponding to the loadable image is executed, which initiates a remote callback, via the link, to the remote facility of the sender to download the contents of the image to the recipient and to display the image at a display of the recipient. Often, such remote callback is performed with some parameters having information related to the recipient's identity. Sometimes, the recipient's identity is embedded within a remote callback without the recipient's acknowledge. As a result, the sender of the document may use such information received from the remote callback from the recipient to obtain the identity information of the recipient, such as, for example, confirming an email address of the recipient or collecting recipient's interest related to the contents of the document for the purposes of marketing.

FIG. 3 is an exemplary message or document illustrating a link associated with an executable portion of the message or document which, when presented to a recipient, may initiate a remote callback to the sender of the document. In this example, the document is in a HTML format. However, a message or document is not limited to the HTML format, and other formats, such as XML (extensible markup language), may be used with embodiments of the invention. Referring to FIG. 3, exemplary document 300 includes, among others, a statement 301 which may be executable when the exemplary document 300 is presented to a user. Statement 301 includes, among others, an address 302 of a remote location where document 300 is initiated from a sender, a reference to loadable image 303, and one or more parameters 304 which may be passed back to the remote location having address 302 when statement 301 is executed. Typically, the content of loadable image 303 (e.g., resources of the image) is remotely located at a remote location of the sender identified by address 302. When document 300 is presented to the recipient and the statement 301 is executed, a remote callback is launched from the recipient back to the sender to download the content or resources of image 303 and to display the content of image 303 at a display of the recipient. The one or more parameters 304 may be used by the sender to encrypt information regarding the recipient's identity passed back to the sender within a remote callback when statement 301 is executed.

According to one embodiment, when a message or document, such as document 300, is received by a recipient (e.g., downloaded from a Web site or received within an email), the document is parsed by an application (e.g., a browsing application or an email client application or an email server application) to search anything that would interact with a sender of the document, such as, for example, an executable statement similar to statement 301, which will launch a remote callback to the sender when the corresponding portion of the document is presented to the recipient. Once the executable portion of the document is identified, the corresponding loadable resource (e.g., loadable image 303) is not loaded or prevented from loading when the document is presented to the recipient, while the rest of the non-executable portion (e.g., portions 305 and 306) of the document may be presented to the recipient. As a result, the executable portion (e.g., executable statement 301) is not executed and the interaction with the remote sender (e.g., the remote callback) is not carried out. Therefore, the identity (e.g. email address) of the recipient, which may be encrypted or shrouded within parameter block 304, not revealed to the sender.

Figure 4A:
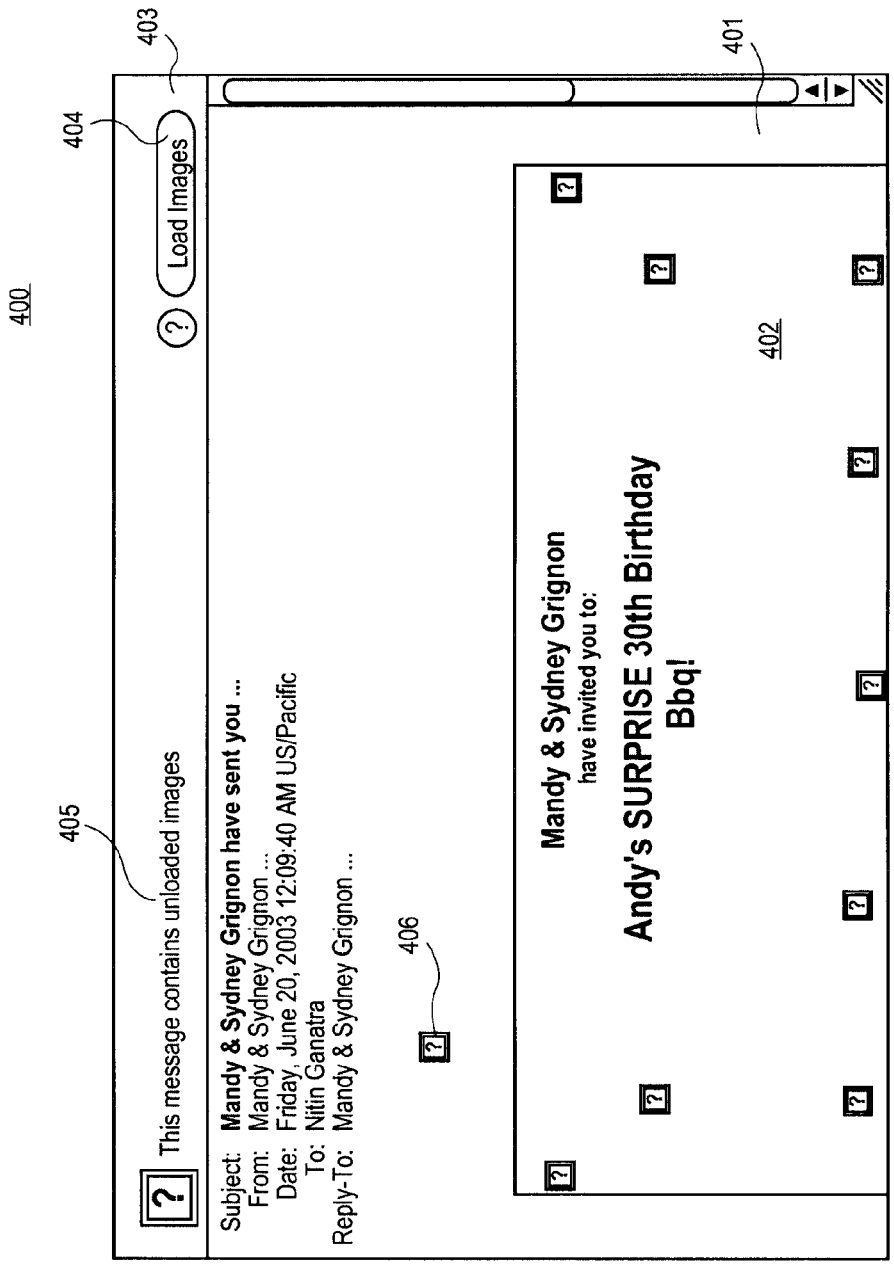
FIGS. 4A and 4B show examples of a user interface which may be used to process incoming data according to one embodiment.
Figure 4B:
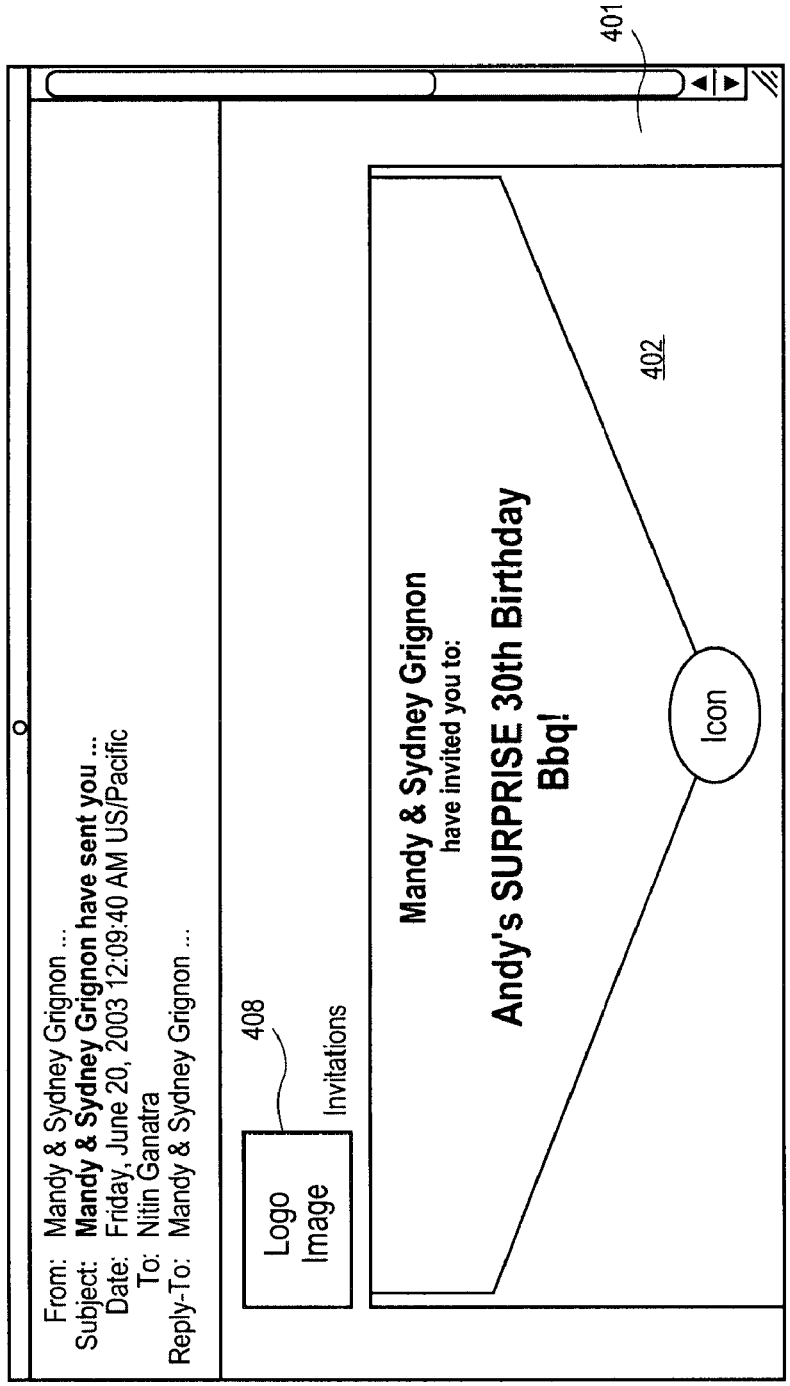

FIGS. 4A and 4B are diagrams illustrating an exemplary user interface for controlling the presentation of information according to one embodiment of the invention. These exemplary user interfaces may be implemented within an email application (e.g., an email client application, such as a Lotus Notes client application software). Referring to FIG. 4A, exemplary user interface 400 includes a window 401 to display a document received. The document presented within window 401 may be received from a remote location via an email. Alternatively, the document may be downloaded from a remote server over a network using a web browser such as Safari from Apple Computer or Internet Explorer from Microsoft. As described above, the document may have an HTML format, or other formats, such as an XML format. The document may contain an executable statement similar to statement 301 of FIG. 3. The executable statement may be executed when the document is presented (e.g. rendered) to the recipient, which launches a remote callback to the sender's facility.

According to one embodiment, when the document is received, the document is parsed by an application (e.g., an email client or a browsing application) to determine whether the document contains an executable portion which, when executed, will initiate a remote callback to the sender (which may include the recipient's identity information). If so, only the non-executable portion of the document is presented to the recipient without executing the executable portion. In this embodiment, the received document contains a loadable image 402 whose content may be located at a remote location of the sender. The loadable image 402 may be associated with a link, similar to the statement 301 of FIG. 3, linking image 402 (e.g., identified by image 303) with resources located at a remote location of the sender (e.g., identified by address 302). According to one embodiment, once the application identifies that the document contains an executable portion, the executable portion of the document is not executed and only the non-executable portion of the document is presented, as shown in FIG. 4A. In an alternative implementation, an application, such as an email program or a web browser program, will display both executable and non-executable portions of a document unless a filtering mechanism (e.g. a latent semantic analysis filtering technique) determines that the document contains content which may be unwanted or unsolicited (e.g. junk email or spam) or is otherwise of a type that the user wants to treat differently than "normal" documents. In this case, the filtering mechanism allows some documents ("legitimate documents") to be completely presented (e.g. displayed on a display device or audio/sounds are played back) and other documents ("suspect documents") are, initiated at least, only partially presented (e.g. in order to prevent a call back to the same server, which sent the document or a different server, or in order to prevent a virus from being activated, etc.).

In addition, according to one embodiment, a banner 403 is presented within the user interface 400. Banner 403 may be displayed on top of the user interface 400, such as a part of a toolbar. Alternatively, banner 403 may be displayed at the bottom of the user interface 400, such as a part of a status bar. Other locations may be used to present banner 403. According to one embodiment, banner 403 includes, among other components, a message 405, which may include an icon or other graphical representation, to indicate the document presented within window 401 may include an unexecuted portion or object, such as an unloaded image, which would be executable otherwise. Banner 403 may also include a button or control 404 to interact with the recipient, which provides an option to the recipient which, if selected, causes the system to execute the executable portion, such as loading the unloaded image.

Furthermore, a document presented without executing one or more executable portions of the document may further include one or more graphical representations, such as graphical mark 406, to represent an underlying unexecuted executable link. For example, graphical mark 406 is associated with a loadable image, similar to image 408 of FIG. 4B, which is presented with a loaded image.

As shown in FIG. 4A, the content of image 402 may be located remotely at the sender's facility via a link, similar to link 301 of FIG. 3 and the content of the image 402 is not presented without the recipient's positive confirmation. When the recipient decides to load the image, the recipient may activate button 404, either by a click of the button via a pointing device (e.g., a mouse) or by pressing a key (e.g., an "Enter" key) from a keyboard. Alternatively, the activation of button 404 may be performed through a voice activated command. In response to a request received via button 404, the application downloads the content or resources of the image 402 and presents the full image 402 to the recipient as shown in FIG. 4B. Meanwhile, a remote callback to the sender's facility may be launched, but only after a positive request from the recipient. Once the image is loaded, banner 403 may be removed from the user interface 400. It will be appreciated that button 404 is not limited to a banner type interface, banner 403 may be implemented as a pop-up window type user interface, similar to user interface 450 of FIG. 4C.

It is appreciated that user interface 400 and the methods described in connection with user interface 400 are not limited to an email application, such as an email client, user interface 400 and the methods described in connection with user interface 400 may also be applied to other applications capable of receiving documents from a remote application, such as a web browsing application, such as, for example, Internet Explorer from Microsoft Corporation or Safari from Apple Computer or Netscape Communicator from Netscape Communications Corporation.

Figure 4C:
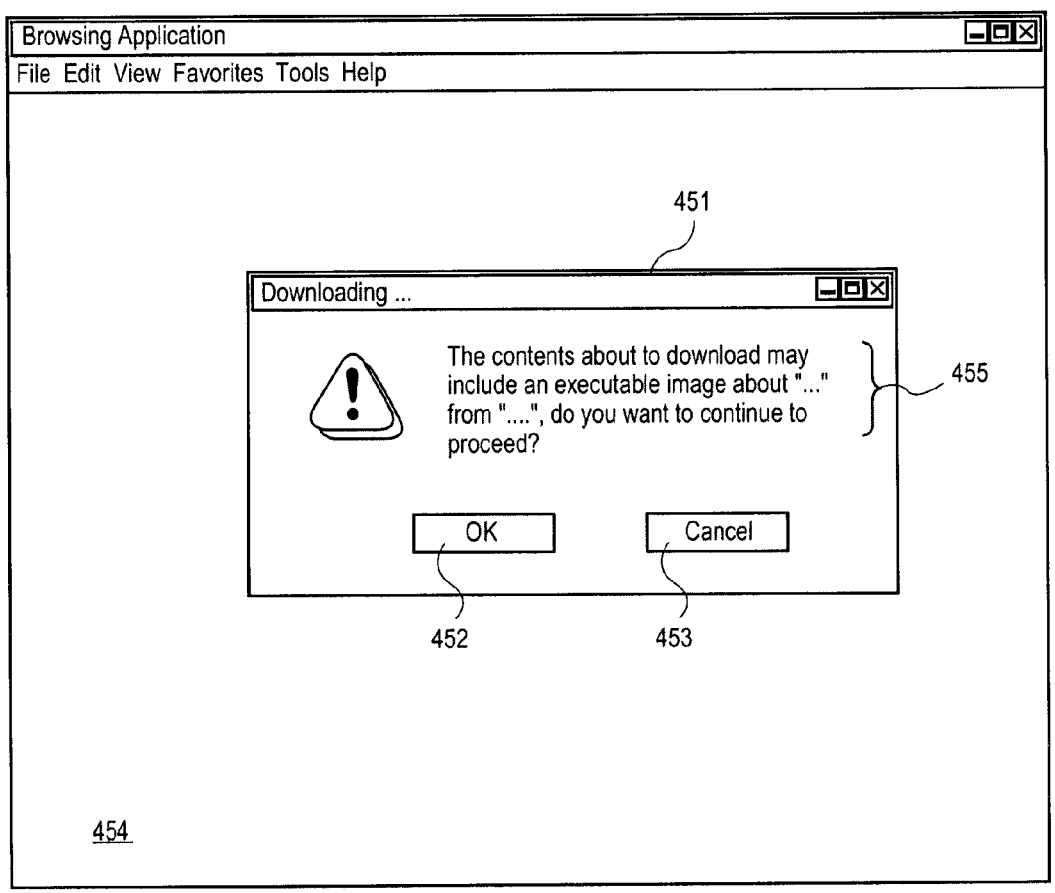
FIG. 4C is an example of a graphical user interface which may be used in a process for processing incoming data according to another embodiment.

FIG. 4C is a diagram illustrating an exemplary user interface of a browsing application which may employ a mechanism described above, according to one embodiment of the invention. In one embodiment, the exemplary interface 450 employs a mechanism to examine the incoming data to determine whether the data is safe to display at a display of a recipient without rendering an executable portion of the data. Typically, when a user downloads a document from a remote server, such as an HTML (hypertext markup language) document from a Web site, the document normally contains texts and a renderable image which may contain an executable script that transfers the information regarding the user back to the originator of the data or to another server. For example, the HTML document may contain a Web beacon or a link that, when presented to a recipient, information regarding the recipient, such as email address of the recipient, may be transferred back to the Web page where the data is downloaded.

A Web beacon (also known as a Web bug) is a file object (usually a graphic image, such as a transparent GIF) that is placed on a Web page or in an email message to monitor user behavior, functioning as a kind of spyware. Unlike a cookie, which can be accepted or denied by a browser user, a Web beacon arrives as just another GIF on the Web page. A Web beacon is typically invisible to the user because it is transparent (e.g., matches the color of the page background) and takes up only a tiny amount of space.

According to one embodiment, the browsing application may parse the contents of the data to display only the non-executable portion of the data (e.g., text portion of an HTML document) without rendering the executable portion of the data (e.g., an HMTL image with URL and possible a Web beacon). As a result, the originator of the data would not be able to monitor activities of the recipient or obtain or verify the user's email address. In a case of document downloaded, a virus embedded within the document would not be activated and cause damage to the recipient's system.

Referring to FIG. 4C, when a user browses a location of a network, such as a Web page of the Internet or a dedicated server of a dedicated network, the user may desire, or by accident (e.g., accidentally click on a link on a Web page, etc.), to download a document from the location. According to one embodiment, a filtering mechanism, which may be installed or embedded within the browsing application, may detect that a document, which may include an executable portion or object, such as a renderable image of an HTML page, an executable script, or a Web beacon, or a link to another server which is about to execute. The browsing application may prompt the user via a user interface 451 to confirm whether the user desires to download the document (or otherwise execute the object or script). According to one embodiment, the filtering mechanism may be implemented with an application, such as browsing application 450, at a client computer system, such as clients 102, 104, 118, and 120 of FIG. 1. Alternatively, the filtering mechanism may be implemented within a gateway system of a local network, such as gateway system 110 of FIG. 1. Furthermore, the filtering application may be implemented within a dedicated system, such as a download engine, used to download documents from an external network (e.g., the Internet).

Referring back to FIG. 4C, the user interface for prompting the user may be implemented as a popup dialog, such as user interface 451. Alternatively, in addition to this dialog, the user interface may be implemented with other control features, such as controls for playing an audio or video clip, or changing an appearance of the computer environment (e.g., colors of a desktop environment).

In addition, according to one embodiment, user interface 451 may further include a message 455 which may include a non-executable portion (e.g., a text portion) of the document and some description (e.g., source identifiers, subject matter etc.) regarding the document or documents. As a result, the user may have enough information regarding the document or documents about to be downloaded or executed, which allows the user to make a decision whether the document or documents should be downloaded or executed safely without sacrificing the security of the user's system. Since message 455 does not include any executable portion of the data, such as a hypertext link or a Web beacon, an action taken by the user would not be sent back to the originator of the document (e.g., a Web page where the document is downloaded from). If the document contains a virus, the virus would not be activated.

For example, when an HTML page is about to download from a Web site, which typically includes a text portion and a renderable image (e.g., a execution portion). According to one embodiment, the system captures or downloads only the text portion and displays a message including the text portion and other information regarding the renderable image (e.g., a subject matter or a location of the corresponding Web page) at user interface 451 without rendering the URL (uniform resource locator) of the HTML page. According to one embodiment, the message may include information indicating whether the document is junk or is otherwise of a type that a user wants to treat different relative to "normal" documents. As a result, even if the HTML page contains a Web beacon, an identity of the user would not be captured by the Web beacon (since the Web beacon is not exposed to the user) and sent back to the Web site. In addition, even if the HTML contains a script, which when executed, may spread a virus, the virus would not cause damage to the user since the executable portion of the HTML is not activated or available to the user. Therefore, the security of the user's system may be greatly improved.

In addition, user interface 450 may be useful when it is implemented in a publicly used computer (e.g., computers used at a library), where minors may be exposed to adult materials through the Internet. For example, a browser of a public computer may include a user interface similar to user interface 450. When a document is downloaded from a Web site, which may contain adult content not suitable for a minor, the user interface 450 may be used to block the adult content to be displayed automatically. Instead a message similar to message 455 is displayed, including information about the material to be downloaded. As a result, a parent or supervisor of the recipient may decide whether to download the material based on the information presented, without exposing the recipient to unwanted material.

Furthermore, user interface 450 may further include a training system that retrains the browsing application based on the interaction with the recipient. For example, if the recipient clicks on cancel button 453, the user interface 450 may record some information about the source of the material (e.g., an address or domain of the Web site where the material is being downloaded). Alternatively, user interface 450 may record the particular behavior of the recipient with respect to the type of the content being downloaded.

Referring back to FIG. 4C, based on the message 455 displayed, if the user desires to download the document, the user may specifically request the system by, for example, clicking "OK" button 452, to download the document. Otherwise, the user may simply instruct the system to reject the document (e.g., by clicking "Cancel" button 453) and no downloading or executing of the document occurs.

Figure 5:
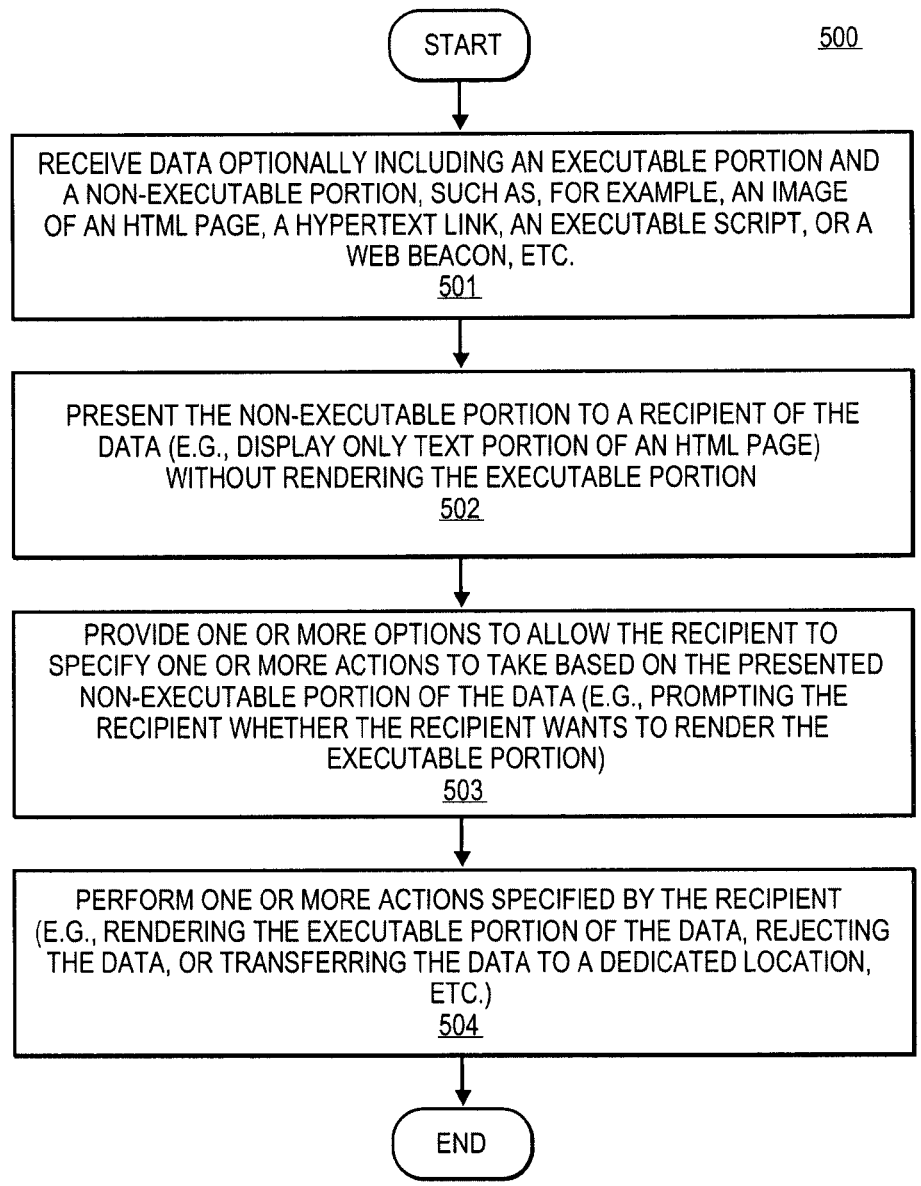
FIG. 5 is a flow diagram illustrating a process for processing incoming data according to one embodiment.

FIG. 5 is a flow diagram illustrating an exemplary process for processing data according to one embodiment of the invention. The exemplary process 500 may be performed by processing logic that may comprise hardware (circuitry, dedicated logic, etc.), or software (such as is run on a general purpose computer system or a dedicated machine). In one embodiment, exemplary process 500 includes receiving data having an executable portion and a non-executable portion, presenting the non-executable portion of the data without rendering the executable portion, the non-executable portion including information regarding the executable portion, and rendering the executable portion of the data only in response to a request from a user.

Referring to FIG. 5, at block 501, processing logic receives data from a data source. The data may include an executable portion and a non-executable portion. The executable portion may be a call back to a server which sent the data, or a call to a different server. The data may be received at a client through downloading from a Web site over the Internet or the data may be an email addressed to the client. Alternatively, the data may be received at a server, such as an email server, which renders the incoming data. For example, the data may be an email received at a mail server or a mail client. According to one embodiment, the data may be an HTML web page or HTML email having a renderable image, which may include a hypertext link, an executable script, or a Web beacon.

At block 502, a non-executable portion of the data is presented to a user without rendering the executable portion. For example, if the data is an HTML page, only a text portion of the HTML is presented or displayed without rendering (e.g. executing) the URL of the HTML page. At block 503, one or more options are presented to the user to allow the user (e.g., the recipient) to specify one or more actions to take based on the information presented (e.g., information including the non-executable portion and information regarding the executable portion, such as subject matter of the executable portion). In one embodiment, the one or more options are presented via a user interface similar to user interfaces shown in of FIGS. 4A, 4B, and 4C. Other user interfaces, such as voice interactive interface, may be utilized. Thereafter, at block 504, one or more actions specified by the user are taken (e.g., rendering the executable portion of the data, completely rejecting the data, or transferring the data to a dedicated box, such as junk mail storage box).

According to one embodiment, in addition to displaying only the non-executable portion of the data, the filtering mechanism may further perform an analysis to determine whether the incoming data is junk and display the information indicating whether the incoming data is junk as a part of the message to prompt the user whether to continue to proceed. In one embodiment, the filtering mechanism may employ a content classification system, such as a latent semantic analysis (LSA), to filter the incoming data and to determine whether the incoming data may be a junk or otherwise of a type which the user wants to treat differently (e.g. categorize the document as junk mail).

Latent semantic analysis (LSA) is a method that automatically uncovers the salient semantic relationships between words and documents in a given corpus. Discrete words are mapped onto a continuous semantic vector space, in which clustering techniques may be applied. The method for filtering messages includes determining a first semantic anchor corresponding with a first group of messages, for example, legitimate messages and a second semantic anchor corresponding with a second group of messages, for example, unsolicited messages (e.g. junk mail and spam), determining a vector corresponding with an incoming message, comparing the vector with at least one of the first semantic anchor and the second semantic anchor to obtain at least one comparison value, and filtering messages based on the comparison value. The LSA method may be used to filter email messages, email attachments, transcribed audio messages, computer programs, e.g., computer viruses, text, and the like. The LSA method may be used to determine which messages and documents are automatically fully rendered if they are determined by the LSA method to "legitimate" messages and which are only partially rendered (e.g. non-executable portions only) if they are determined to be unsolicited (or otherwise not legitimate) messages.

According to one embodiment, the filtering mechanism or system may be employed individually on a machine for a particular user or on a central machine, e.g., an email server, to filter out email messages for a group of email recipients. Alternate embodiments may include employing the filtering system on a server or other device that communicates with a remote user, for example, a user using a wireless device such as a wireless personal digital assistant (PDA) or wireless palm top computer or cell phone or pages, so that the limited memory of the wireless device is not unnecessarily filled with unsolicited messages. Alternate embodiments may employ the filtering system on the PDA and unsolicited messages may be discarded as soon as they are received. Further detailed information concerning the LSA analysis and the filtering system can be found in a co-pending U.S. patent application Ser. No. 09/881,986, entitled "Method and Apparatus for Filtering Email", filed on Jun. 14, 2001, which is assigned to a common assignee of the present application, and which is hereby incorporated by reference.

Figure 6A:
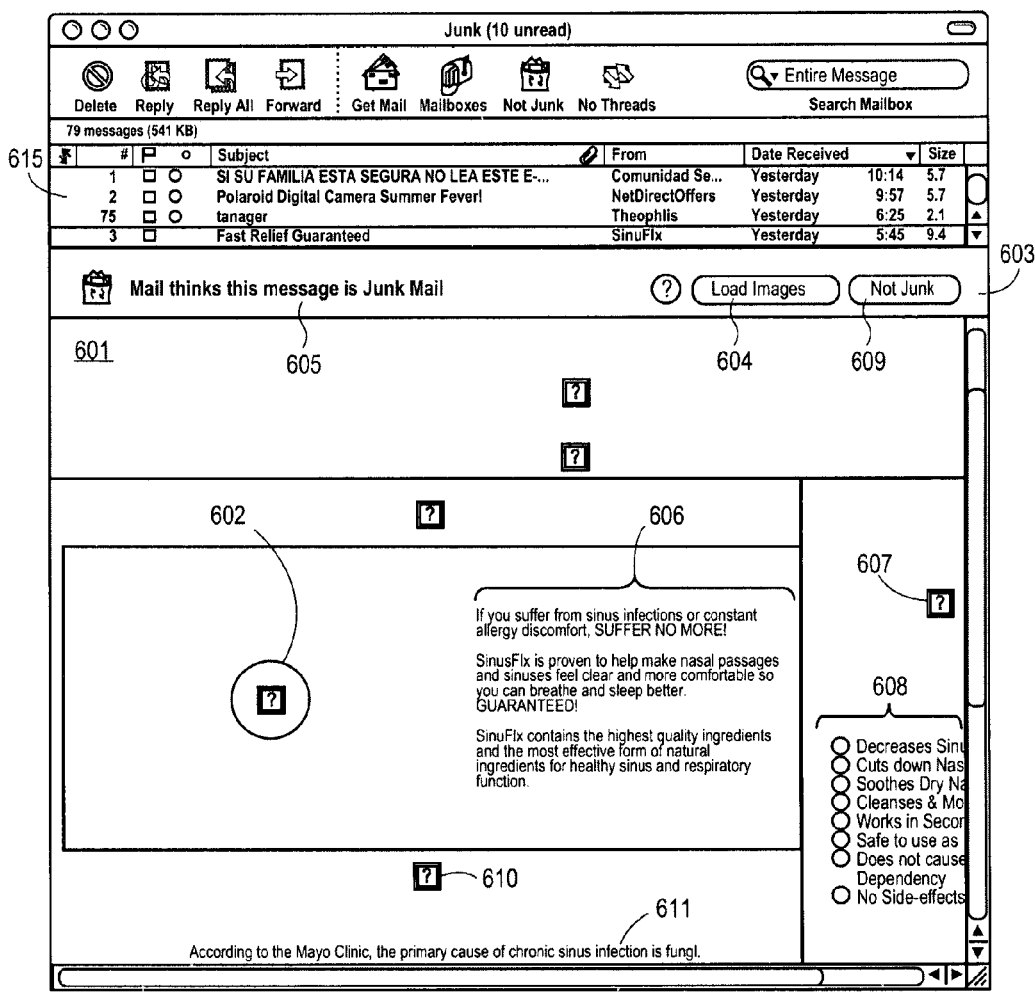
FIGS. 6A and 6B show examples of a user interface which may be used to process incoming data using a filtering mechanism according to one embodiment.
Figure 6B:
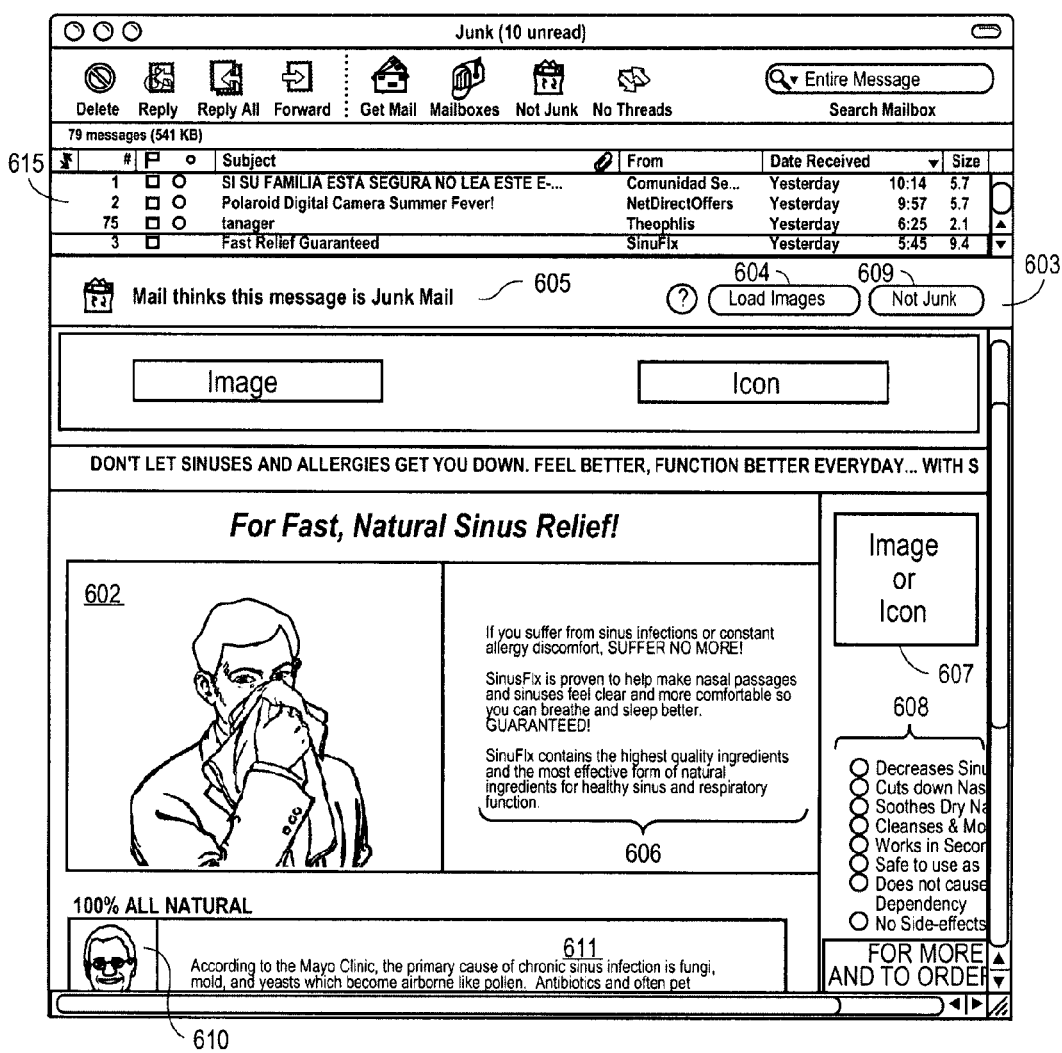

FIGS. 6A and 6B are block diagrams illustrating an exemplary user interface which may employ a filtering mechanism having a LSA analysis capability, according to one embodiment of the invention. Exemplary user interface 600 may be implemented within an email client application or an email server application. For example, exemplary user interface 600 may be a part of an Inbox of an email client. Alternatively, exemplary user interface 600 may be a part of a user interface of a download facility (e.g., download engine) accessible by an individual, such as an administrator. Furthermore, exemplary user interface 600 may be implemented within an application capable of receiving incoming data over a network, such as, for example, a web browsing application or a personal organizer, etc. That is, when the respective application detects data that is about to receive (via the filtering system), the exemplary user interface may be presented to the recipient of the data.

Referring to FIG. 6A, according to one embodiment, exemplary user interface 600 includes a first area 615 for holding one or more documents received and a second area 601 for displaying the document. When user interface 600 is implemented within an email system, the first area 615 may be a part of an Inbox and the second area 601 may be a part of a preview area for one of the items in the Inbox. Alternatively, the user interface 600 may be a popup window from an application capable of receiving data over a network, such as, for example, a browsing application.

According to one embodiment, the second area 601 may be used to display a non-executable portion of the document instead of displaying the entire document. When the non-executable portion of the document is presented within window 601, a banner 603 is displayed. The banner 603 includes a button 604 to load the executable portion of the document and a message 605 to indicate the status of the document.

In addition, according to one embodiment, exemplary user interface 600 may further employ a filtering system to further determine whether each of the incoming items is junk, using one of the aforementioned techniques, such as, for example, a LSA analysis. The result of filtering may be displayed via message 605 of banner 603 to indicate whether the selected item is junk. Furthermore, a graphical indication, such as an icon, may be included to further notify the recipient. Other notification mechanism, such as audio and video messages, may be utilized.

Note that only the non-executable portion of the message is displayed and this may happen automatically when the LSA method determines that the document should not be fully rendered (e.g. it may be junk mail or otherwise unsolicited or may contain a virus). The recipient may be prompted to confirm whether the user wants to render the whole message with button 604. If the user wants to render the whole message, the user may select or click on button 604 to instruct the system to render the whole message. In addition, banner 603 may further include a "not junk" button 609 to indicate the message presented is not a junk message. If the recipient does not agree with the system which indicates the current message is a junk message, the recipient may activate button 609 to indicate the current message is not a junk message. As a result, the system may move the message from junk box back to the inbox or a dedicated folder and the system may retrain the LSA system based on the contents of the current message.

It is important to note that the filtering system involved may include some learning intelligence to capture the user's interaction regarding the message on whether the user regards the message as junk. That is, unlike a conventional junk mail filtering system, according to one embodiment, the filtering system of the present invention takes into account the personal interaction or personal tastes (also referred to as personal information) of a user when determining whether a particular message or document is junk. In one embodiment, the filtering system may record the actions taken by the user regarding the message and uses the recorded information in the subsequent processes to determine whether the subsequent messages may be junk. The learning mechanism of the filtering system may employ some genetic programming or neural network techniques well known in the art. The filtering system may be fine tuned via one or more training methods, which will be described further below.

Note that message indicating the message as junk and "not junk" button 609 are displayed only when the system thinks the message may be a junk message (e.g. when the LSA system determines that the message belongs in an "unsolicited" category). When a user activates the "not junk" button 609, the system will record such interactions for subsequent processes. That is, when the user subsequently selects the same message again, the "not junk" button 609 may not be displayed again, because the system has learned that the user has determined the message is not a junk message. However, banner 603 may or may not be displayed subject to the recipient's configuration, which will be discussed in detail further below.

Referring back to FIGS. 6A and 6B, in addition to the non-executable portion of the document, the user interface 600 may also display a graphical representation representing an executable portion associated with the non-executable portion of the document. For example, graphical icons 602, 607, and 610 are associated with the non-executable portions 606, 608, and 611 respectively. Based on the information of the non-executable portions 606, 608, and 611, the recipient may have enough information to determine whether to execute the executable portions 602, 607, and 610. Furthermore, the recipient may also make the decision based on message 605 whether the message is considered is a junk message. If the recipient decides to load the image, the recipient may activate button 604 to load the images (e.g., execute executable portions 602, 607, and 610), as shown in FIG. 6B.

Figure 7:
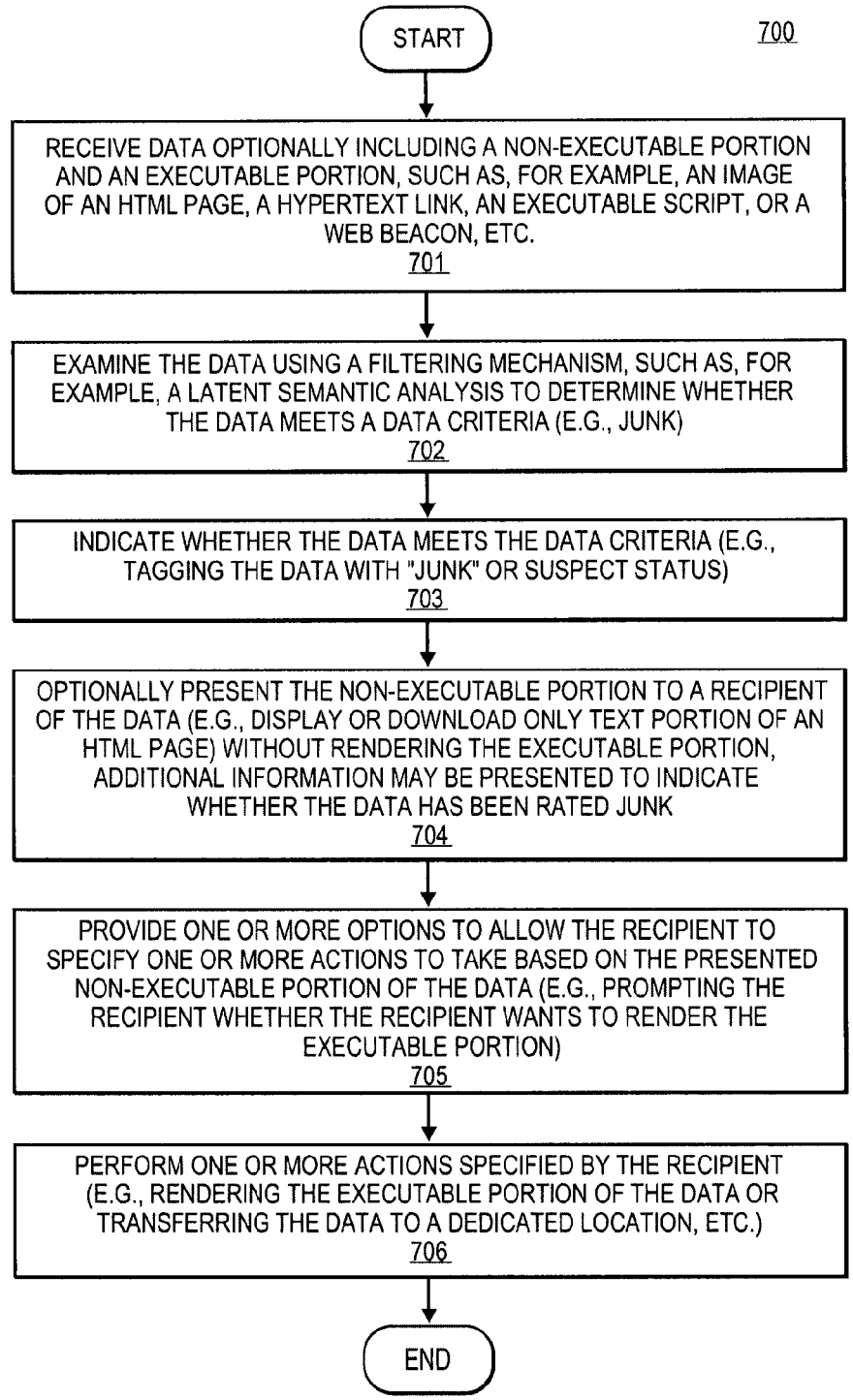
FIG. 7 is a flow diagram illustrating a process for processing incoming data using a filtering mechanism according to one embodiment.

FIG. 7 is a flow diagram illustrating an exemplary method for processing incoming data according to one embodiment of the invention. In one embodiment, exemplary method 700 includes determining whether data meets a data criteria based on a rating of the data, the data including an executable portion and a non-executable portion, presenting the non-executable portion of the data without executing the executable portion of the data if the data meets the data criteria, and indicating whether the data meets the data criteria.

Referring to FIG. 7, at block 701, processing logic receives data from a data source. The data may include an executable portion and a non-executable portion. The data may be received at a client system through downloading from a Web site over the Internet or through receipt of an email document. Alternatively, the data may be received at a server, such as mail server, which renders the incoming emails. For example, the data may be an email received at a mail server or a mail client. According to one embodiment, the data may be an HTML page having a renderable image, which may include a hypertext link, an executable script, or a Web beacon.

At block 702, processing logic examines the data to determine whether the data meets a data criteria (e.g., whether the data is junk). In one embodiment, the processing logic invokes a latent semantic analysis (LSA) as a part of the examination. According to one embodiment, the data is examined based on the rating of the data. If the data is determined to meet the data criteria (e.g. the data is not "legitimate" but rather appears to be unsolicited), at block 703, the data may be tagged as "junk" or with a suspect status.

At block 704, a non-executable portion of the data is presented to a user without rendering the executable portion if it has been determined that the data is "junk" or suspect. For example, if the data is an HTML page, only a text portion of the HTML is presented or displayed without rendering the URL of the HTML page. In addition, additional information may be presented to indicate whether the data has been rated as "junk". If the data has been determined to be "legitimate" by the examination in operation 702, then all of the content (both executable and non-executable portions) is displayed automatically as a result of such determination, although the user may be given an option in a configuration menu to prevent the automatic display of all content even if it appears to be legitimate to the LSA system.

At block 705, one or more options are presented to the user to allow the user (e.g., the recipient) to specify one or more actions to take based on the information presented (e.g., information including the non-executable portion and information regarding the executable portion, such as subject matter of the executable portion). In one embodiment, the one or more options are presented via a user interface similar to user interface 600 of FIG. 6. Other user interfaces, such as voice interactive interface, may be utilized. Thereafter, at block 706, one or more actions specified by the user are taken (e.g., rendering the executable portion of the data, completely rejecting the data, or transferring the data to a dedicated box, such as junk box).

Figure 8:
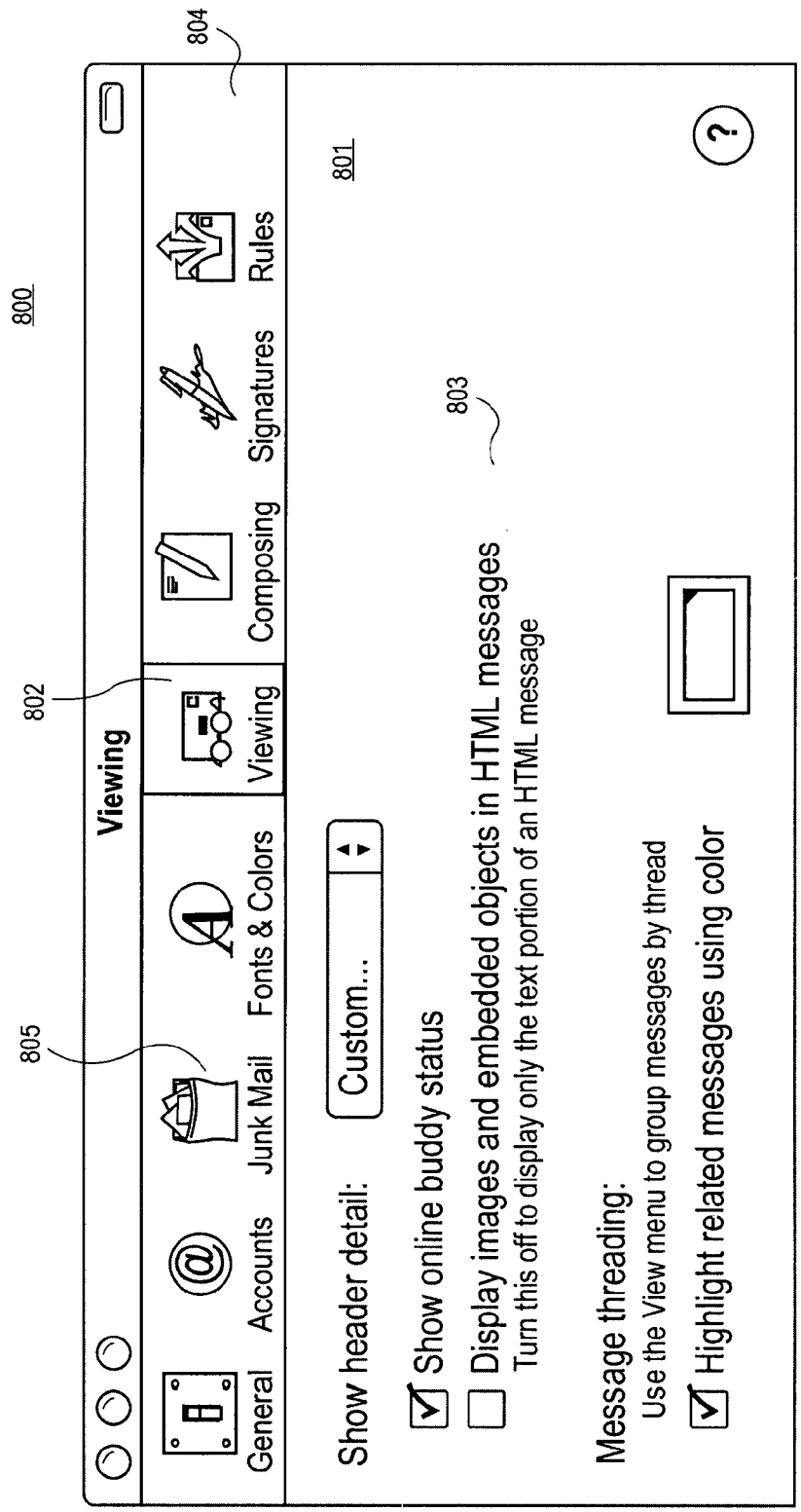
FIG. 8 shows an example of a user interface for configuring operations for processing incoming data according to one embodiment.

According to one embodiment, user interfaces shown in FIGS. 4A-4C and FIGS. 6A-6B are configurable through a configuration user interface. For example, banner 403 and 603 of user interfaces 400 and 600 may be configurable by a user. FIG. 8 is a diagram illustrating an exemplary configuration user interface according to one embodiment. Exemplary user interface 800 includes a plurality of subsections displayed in a tool bar 804, including a viewing section 802. When section 802 is selected, information and controls associated with section 802 is displayed in a window 801.

In one embodiment, section 802 includes an option 803 to allow a user or a recipient to determine whether the application will automatically execute the executable portion (e.g., loading and displaying one or more images) of an incoming message. If option 803 is turned on (e.g., the checkbox of option 803 is checked), any executable portion of an incoming message or document will be executed. In the case of an HTML page, images of the HTML web page or HTML email will be automatically displayed, as shown in FIGS. 4B and 6B, without first prompting the recipient via, for example, banner 403 or 603 of FIGS. 4A and 6A.

If option 803 is turned off (e.g., the checkbox of option 803 is unchecked), any executable portion of an incoming message or document will not be executed and only the non-executable portion is displayed. In the case of an HTML page from a Web page, images of the HTML page will not be automatically displayed. Instead, the recipient will be prompted through a user interface similar to user interfaces shown in FIGS. 4B and 6B to select whether or not to display the full page or document. The images of the document will only be displayed upon a request received from the recipient (e.g., a request received from a "load image" button, such as buttons 404 and 604 of FIGS. 4A and 6A).

According to one embodiment, the above described filtering operations may be executed automatically. In addition, a database may be utilized to store the filtering information including users' interactions regarding the data. The database may be updated or trained by a training system recursively. A set of policies or rules regarding the filtering operations may be configured through a graphical user interface by an individual on a client system or by an administrator on a server system. The filtering operations may be performed based on a rating mechanism and personal information of a user, using the learning techniques, such as an LSA analysis.

Figure 9A:
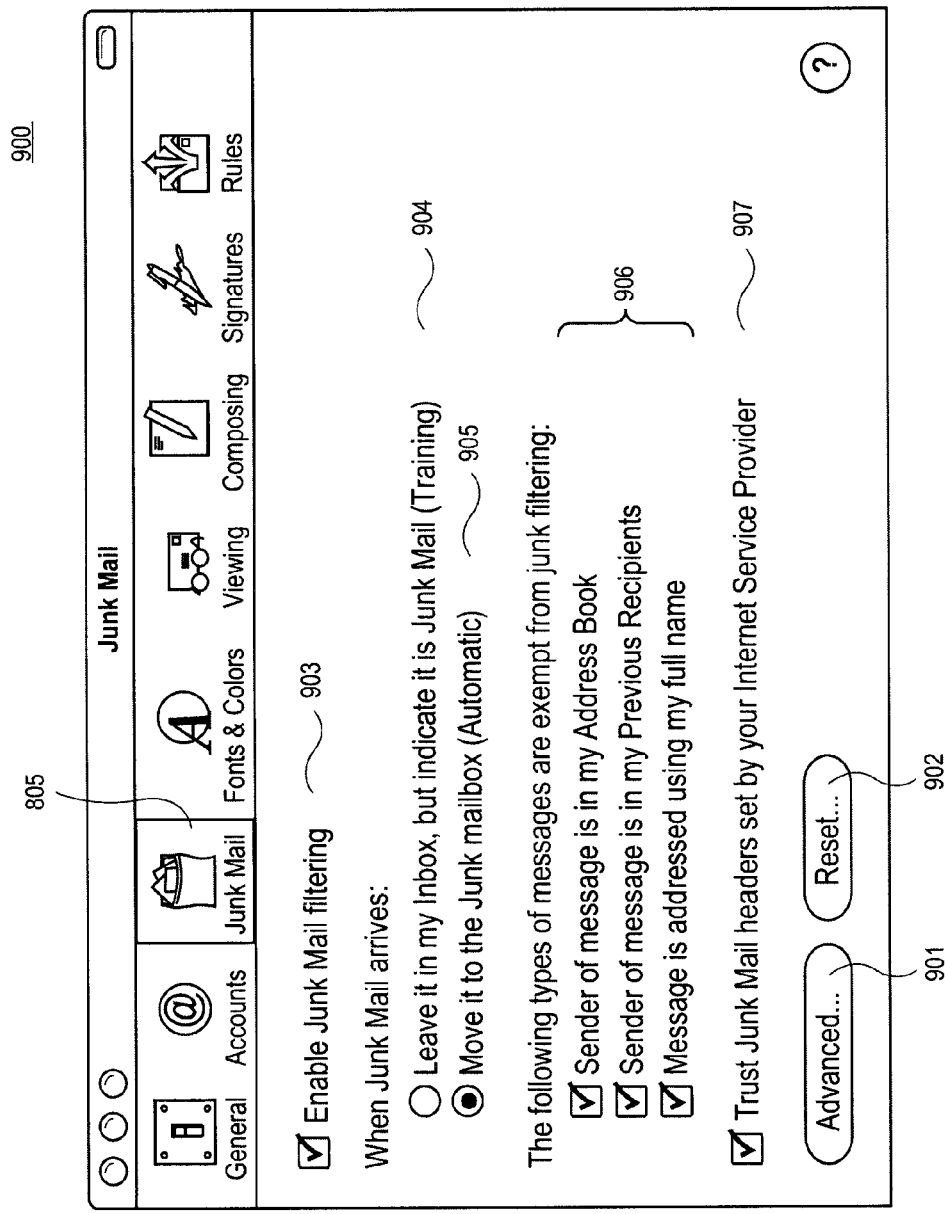
FIGS. 9A-9C shows examples of a user interface for configuring operations for processing incoming data according to another embodiment.
Figure 9B:
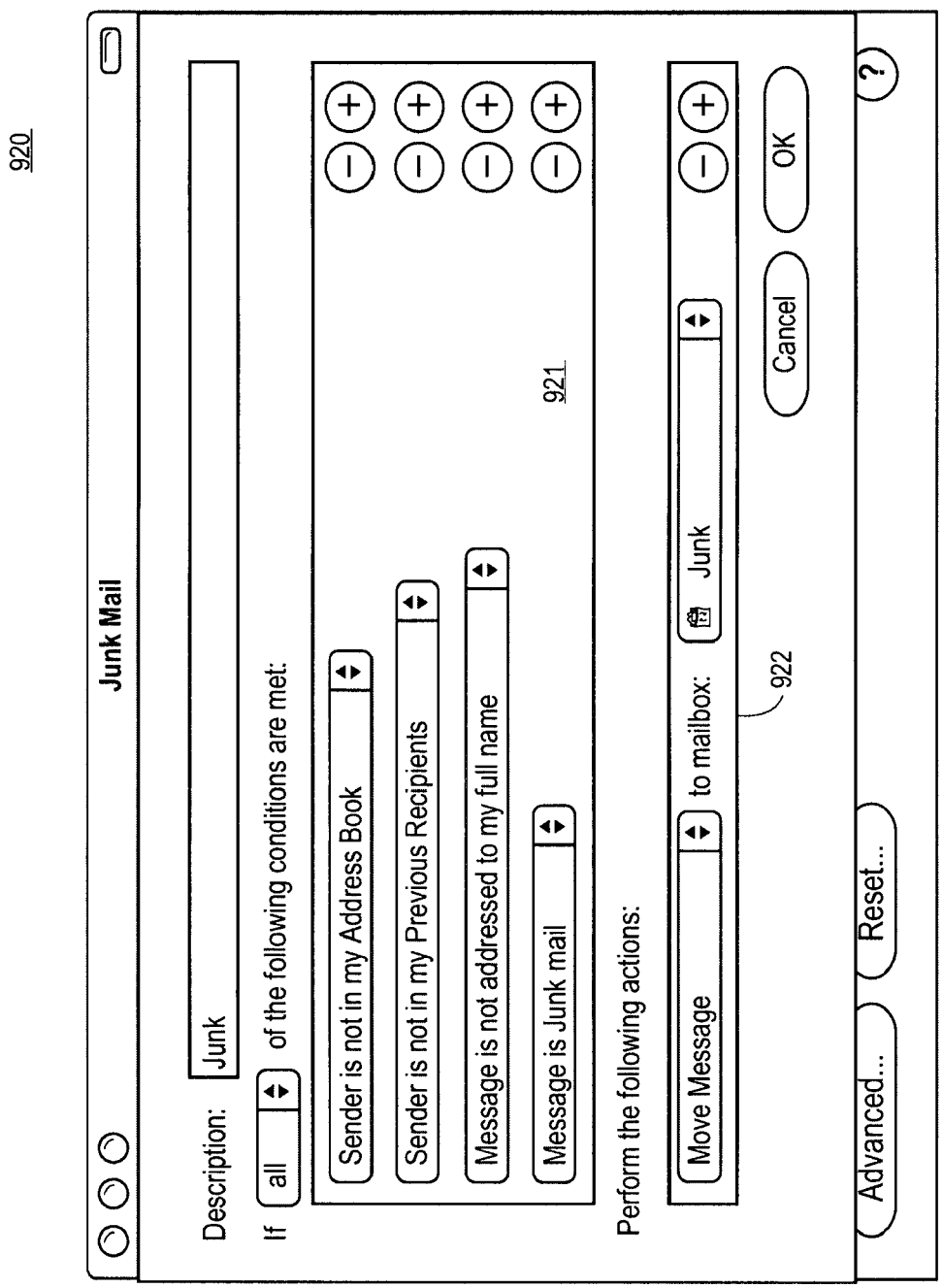
Figure 9C:
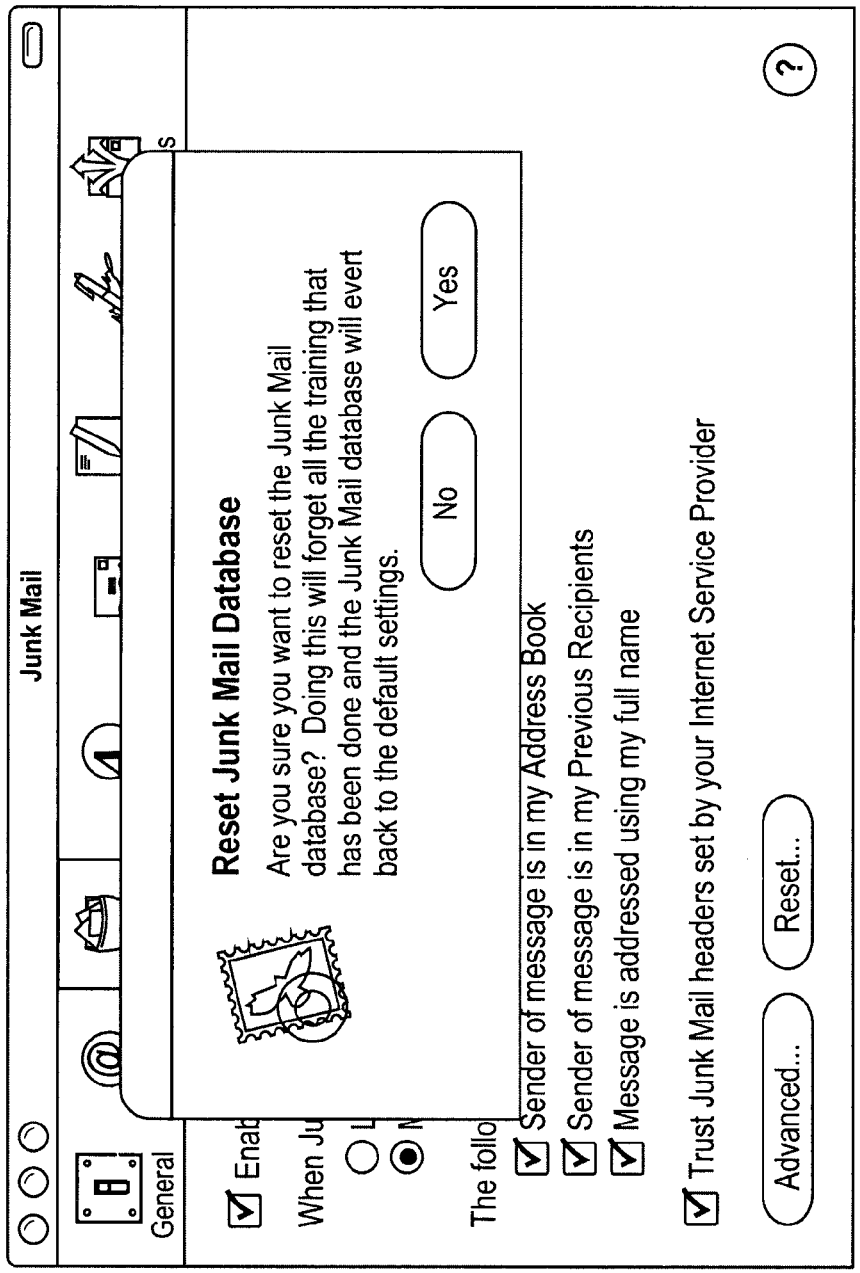

FIGS. 9A-9C are diagrams illustrating exemplary configuration user interfaces for processing incoming data according to one embodiment of the invention. Exemplary user interface 900 may be brought up by activating section 805 from user interface 800 of FIG. 8. Exemplary user interface 900 may be implemented within an email client or email server application. For example, exemplary user interface 900 may be a part of a setup page of an email client. Alternatively, exemplary user interface 900 may be a part of a user interface of a download facility (e.g., download engine) accessible by an individual, such as an administrator. Furthermore, exemplary user interface 900 may be implemented within an application capable of receiving incoming data over a network, such as, for example, a web browsing application or a personal organizer, etc. That is, a user of an application capable of receiving data over a network may use exemplary user interface 900 to configure how the data is received and examined.

Referring to FIG. 9A, exemplary user interface 900 includes, among others, an option 903 to enable or disable the junk mail filtering functionality. In one embodiment, the junk mail filtering functionality, which may be enabled or disabled by option 903, may include the functionality of a latent semantic analysis (LSA) to determine whether an incoming message is junk or is otherwise of a type which is to be treated differently than normal documents. When option 903 is checked, the junk mail filtering functionality is enabled and every incoming message is examined using a LSA analysis and according to a set of rules, such as the rules set by configuration user interfaces shown FIGS. 9B-9C and FIGS. 10A-10C.

According to one embodiment, when the junk mail filtering functionality is enabled (e.g., option 903 is checked), the junk mail filtering operations may be in an automatic operating mode which is activated by option 905, or alternatively, in a training mode which is activated by option 904. When the junk mail filtering operations are processed in the automatic mode, the identified junk mails or messages may be processed in accordance with a set of policies set by the recipient. For example, as shown in user interface 920 of FIG. 9B, the recipient may specify one or more conditions 921, which when the one or more conditions 921 are met, one or more corresponding actions 922 may be performed accordingly. For example, in addition to displaying a message indicating the message may be a junk message, similar to banner 603 of FIG. 6A, the suspected junk message may be moved to a dedicated folder (e.g., a junk mail folder). Of course, the recipient may disagree with the system by pressing "Not Junk" button 609, which may relocate the message back to a normal folder (e.g., an Inbox folder), and such action from the recipient may further retrain the system (e.g. retrain the LSA system) for subsequent message processes. Note that exemplary user interface 920 may be activated when the "Advanced" button 901 is activated from user interface 900 of FIG. 9A. Other configurations may exist.

Referring back to FIG. 9A, according to one embodiment, exemplary user interface 900 further includes one or more exemptions 906 which allow the recipient to specify one or more conditions which when met, the messages are exempted from the junk mail filtering operations. For example, when an incoming message satisfies at least one of the conditions set by options 906, the incoming message is not processed by the junk mail filtering operations (e.g., the LSA is not performed on the message), which speeds up the message processes and consumes less resources. FIG. 9B shows an example of a user interface which allows the user to specify how junk mail is handled.

According to another embodiment, exemplary user interface 900 further includes an option 907 to specify whether a recipient would trust a junk status set by its Internet service provider (ISP), which may be standardized by one or more organizations in the field. For example, if option 907 is checked, the application (e.g., the email application or the browser) will check the incoming messages to see whether the header of the message indicating the message as junk, such as the "X-Spam-Flag" header, is set to "YES", and if so, the message is automatically marked as junk. This header may be set by other standardized applications, such as SpamAssassin and BrightMail, during the junk evaluations, which may be processed by some ISPs or other organizations, such as universities, on their servers.

When training option 904 is activated, according to one embodiment, the incoming message identified as a suspected junk mail would not automatically be put in a junk mail folder. Instead, the suspected junk mail may still be placed in an inbox as other normal messages, but with an indication indicating that the message may be a junk message. The recipient may expressly specify whether indicated message is a junk message. Once the instruction specifying whether the message is a junk message from the recipient is received, the system would train an internal system (e.g. an LSA system) or database for subsequent message processes.

Training option 904 may be used to allow a user to request the system be put into a training mode. While in the training mode, the system is trained to recognize the kind of data that the user considers as junk, which may be any input that is unwanted by the user. Automatic option 905 may be used to allow a user to request that the system be put into an automatic mode. While in the automatic mode, the system automatically categorizes incoming data as junk or not junk, and takes appropriate actions based on the categorizations. If, while in automatic mode, a user indicates that a message, initially labeled as "junk" by the system (e.g. LSA system) is not junk, the LSA system is automatically retrained to take into account the new message.

Furthermore, according to another embodiment, reset button 902 may be provided to allow a user to request the system to reset the training of the system back to the initial factory settings. Reset option 902 causes the system to undo all of the previous training, as shown in FIG. 9C.

Figure 10A:
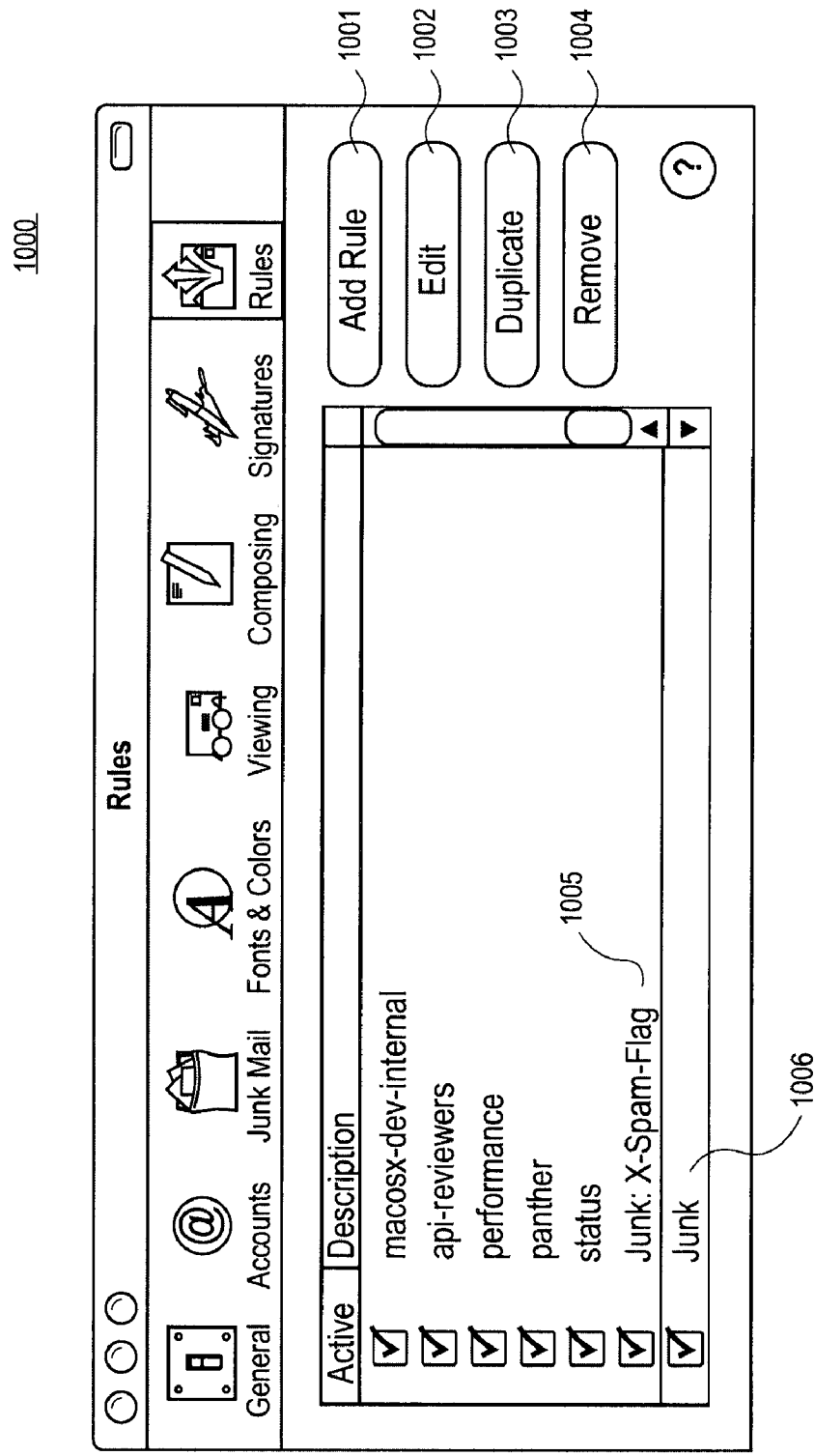
FIGS. 10A-10C show further examples of a user interface for configuring operations for processing incoming data according to yet another embodiment.

FIG. 10A is a block diagram illustrating an exemplary configuration user interface for processing incoming data according to one embodiment of the invention. Exemplary user interface 1000 may be implemented within an email client or server application. For example, exemplary user interface 1000 may be a part of a setup page of an email client. Alternatively, exemplary user interface 1000 may be a part of a user interface of a download facility (e.g., download engine) accessible by an individual, such as an administrator. Furthermore, exemplary user interface 800 may be implemented within an application capable of receiving incoming data over a network, such as, for example, a browsing application or a personal organizer, etc. That is, a user of an application capable of receiving data over a network may use exemplary user interface 1000 to set up a set of policies regarding how the data is received and examined.

Figure 10B:
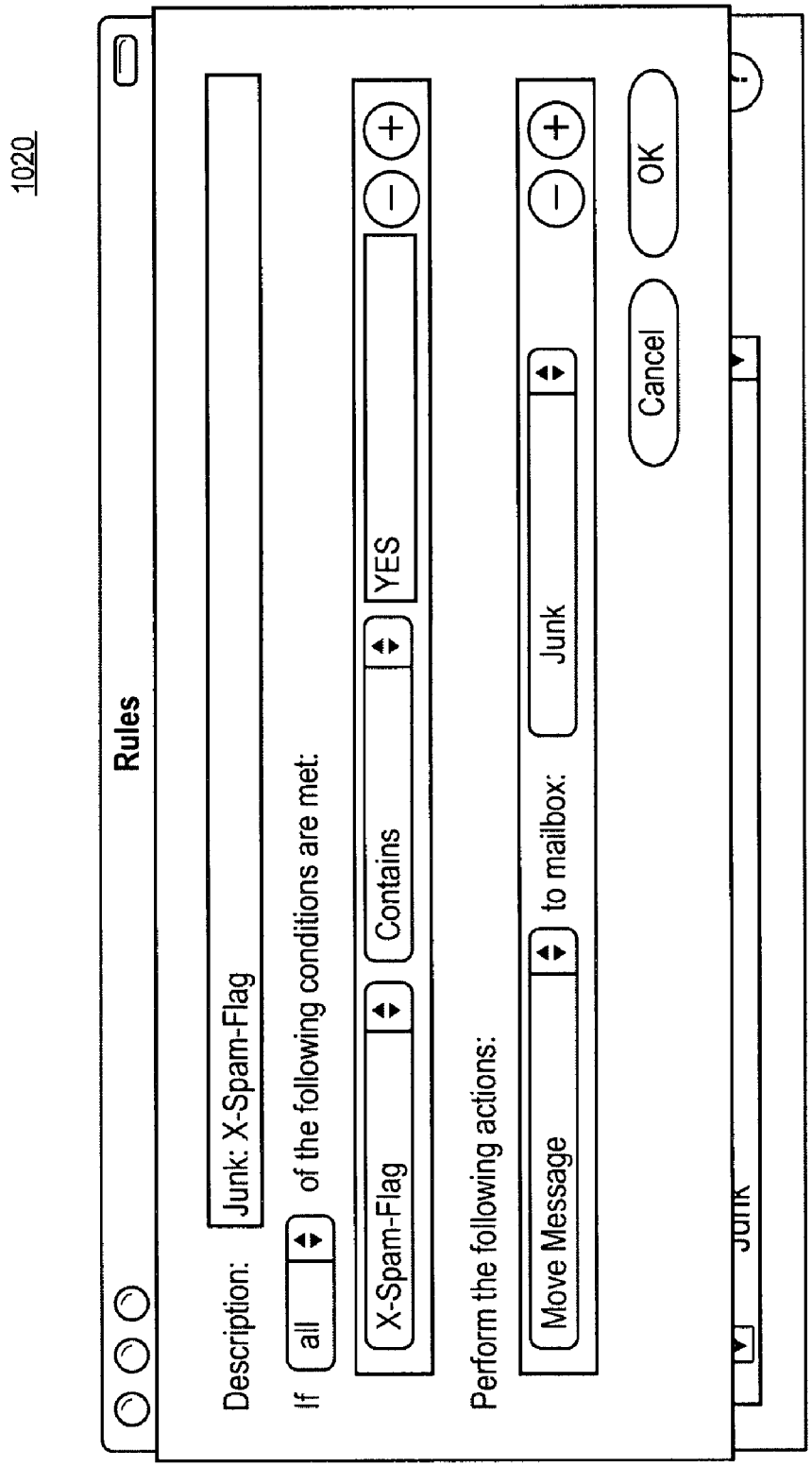
Figure 10C:
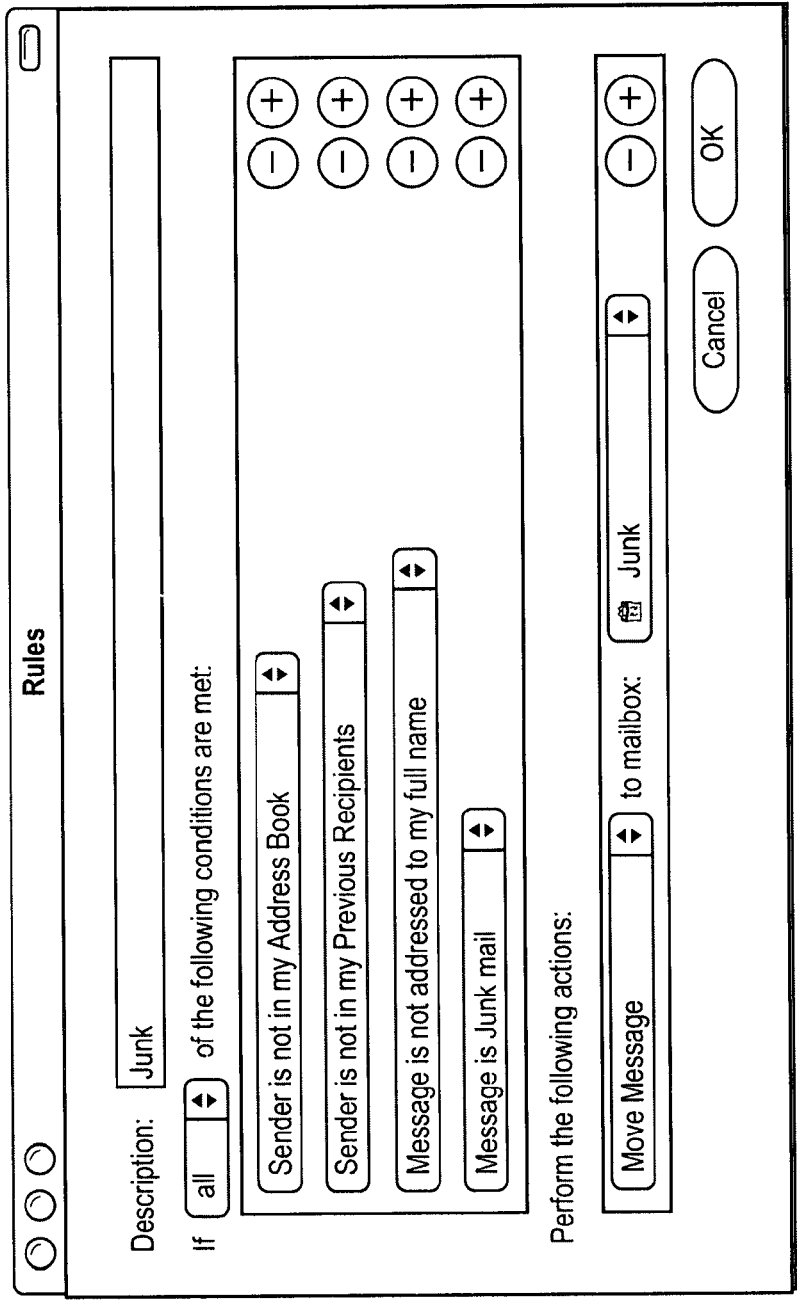

Referring to FIG. 10A, exemplary user interface 1000 allows a user to specify a set of rules regarding incoming message processes. According to one embodiment, a user may add, edit, duplicate, and remove one or more rules via button 1001, 1002, 1003, and 1004 respectively. Each of the rules, such as rules 1005 and 1006 may be individually edited by pressing the edit button 1002, as shown in FIGS. 10B and 10C respectively. Note exemplary user interface 1040 of FIG. 10C may also be accessed via the "Advanced" button 901 of FIG. 9A. Other features may be used in the user interfaces 1000, 1020, and 1040 of FIGS. 10A-10C. For example, exemplary user interface 1020 or 1040 may further include an option that allows a user to specify an audio or video clip to be played upon detecting junk data.

Figure 11:
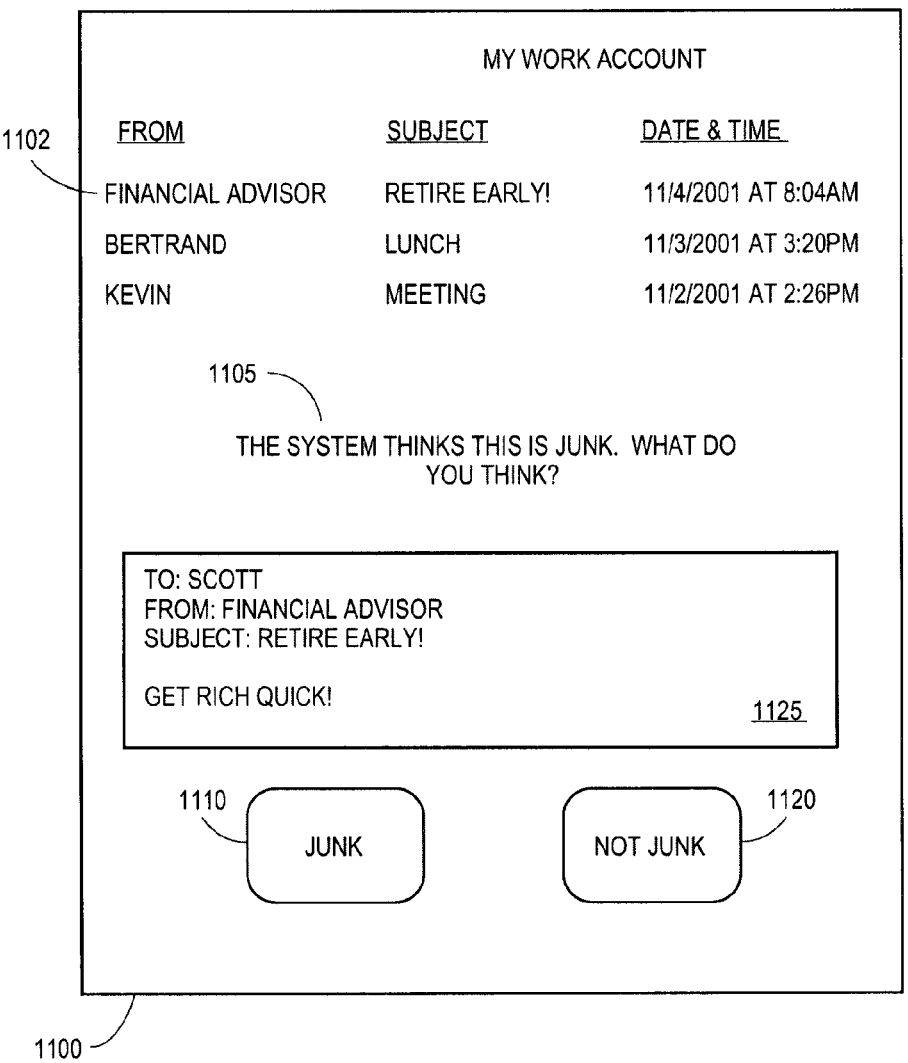
FIG. 11 is a block diagram of a user interface for processing incoming data in a training mode according to one embodiment.

FIG. 11 is a block diagram illustrating an exemplary user interface for processing incoming data during a training mode according to one embodiment of the invention. Referring to FIG. 11, during a training mode which may be enabled via training option 904 of FIG. 9A, when the system detects that the incoming data (e.g., incoming data item 1102) may be junk using one of the aforementioned techniques, such as a latent semantic analysis, the system may display a message 1105 in order to receive training data or feedback from the user via buttons 1110 and 1120. In one embodiment, if the system cannot determine whether the respective data is junk, the exemplary user interface 1100 may also be used to ask the user to confirm whether the user considers the data is junk, either in a training mode or a normal operating mode. In addition, a portion of the incoming data 1125, such as non-executable portion of the data, may be displayed without rendering executable portion of the data. As a result, an identity of the user would not be revealed or a virus embedded within the data would not be activated. Other features apparent to those with ordinary skill in the art may be included. Alternatively, exemplary user interface 600 of FIGS. 6A and 6B may be used for training purposes. Further detailed information concerning a filtering system based on rating and training can be found in a co-pending U.S. patent application Ser. No. 10/213,922, entitled "Filtering of Data", filed on Aug. 6, 2002 and in co-pending U.S. patent application Ser. No. 10/430,694, filed May 5, 2003, which are assigned to a common assignee of the present application, and which are hereby incorporated by reference.

Certain embodiments described in this description assume that a user wants to see the "safe" content of a document which has been categorized by a filtering technique (e.g., an LSA filtering technique); thus, in these certain embodiments, the "safe" content (e.g., non-executable text) is automatically presented to the user when the user selects the document for presentation, but the "suspect" part of the content is not presented unless the user specifically commands the system to present the "suspect" part. However, a user may set up the system, through, for example, a configuration menu similar to those shown in FIGS. 8, 9A-9C, and 10A-10C, so that if the filtering technique (e.g., an LSA technique) determines that the document contains "suspect" material (e.g., a Web beacon or a virus) then the system does not present any part of the document and the document is moved or otherwise associated with a trash folder or container or a suspect or junk folder or container. The user can then open the trash or junk folder (rather than an "Inbox") to see a listing of suspect document and decide whether to select one or more for at least partial (e.g., safe only) presentation.

Alternatively, the user may set up the system, through, for example, a configuration menu similar to those shown in FIGS. 8, 9A-9C, and 10A-10C, so that if the filtering technique determines that the document contains suspect material than the system presents only a reference to the document in a listing (such as a listing of received emails in an "Inbox" before the email is opened, where the reference may include a title or subject matter of the document and an identifier of the sender) and the user can open the suspect document (to show initially only the safe content) from the listing.

Thus, methods and apparatuses for processing data have been described. In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method, comprising:

receiving, using one or more processors, email or message data including a non-executable portion and an executable portion;

using, using the one or more processors, latent semantic analysis to divide the email or message data into two categories, wherein email or message data in a first category is fully rendered, and wherein email or message data in a second category is partially rendered;

parsing, using the one or more processors, the email or message data in the second category, wherein parsing includes searching the email or message data for anything that would interact with a remote location and determining whether the email or message data includes an executable portion, wherein an executable portion interacts with a sender of the email or message data, and wherein an executable portion includes one or more parameters capable of encoding the identity of a recipient;

presenting, using the one or more processors, the parsed email or message data, wherein only the non-executable portion is presented to a recipient and the identity of the recipient is not revealed to the sender, and wherein when the parsed email or message data includes an executable portion, the presentation includes an indication that the email or message data includes an executable portion, and one or more options specifying one or more actions corresponding to the executable portion; and receiving, using the one or more processors, a selection corresponding to an option and performing any actions associated with the option when the parsed email or message data includes an executable portion.

2. The method of claim 1, wherein when the email or message data includes an executable portion including anything that would interact with a remote location, the executable portion is not loaded, and an option to load the executable portion is presented.

3. The method of claim 1, wherein when the email or message data includes an executable portion including anything that would interact with a remote location, the executable portion is automatically loaded.

4. The method of claim 1, wherein the indication is a message including an option to request a presentation of the executable portion.

5. The method of claim 4, wherein when a presentation of the executable portion is requested, the option is removed from the message.

6. The method of claim 1, wherein the indication is a message that blocks the presentation until an option is selected.

7. The method of claim 1, wherein the indication is an audio message or a video message.

8. The method of claim 1, wherein data corresponding to the selection is saved.

9. The method of claim 1, wherein parsing includes determining whether the email or message data is unsolicited, wherein when the email or message data is unsolicited, an interactive graphic is displayed.

10. The method of claim 9, wherein determinations are stored, and wherein activating the interactive graphic changes the stored determinations.

11. The method of claim 10, wherein stored determinations are undone.

12. A system, comprising:
one or more processors;
a computer-readable storage medium containing instructions configured to cause the one or more processors to perform operations, including:
receiving email or message data including a non-executable portion and an executable portion;

using latent semantic analysis to divide the email or message data into two categories, wherein email or message data in a first category is fully rendered, and wherein email or message data in a second category is partially rendered;

parsing the email or message data in the second category, wherein parsing includes searching the email or message data for anything that would interact with a remote location and determining whether the email or message data includes an executable portion, wherein an executable portion interacts with a sender of the email or message data, and wherein an executable portion includes one or more parameters capable of encoding the identity of a recipient;

presenting the parsed email or message data, wherein only the non-executable portion is presented to a recipient and the identity of the recipient is not revealed to the sender, and wherein when the parsed email or message data includes an executable portion, the presentation includes an indication that the email or message data includes an executable portion, and one or more options specifying one or more actions corresponding to the executable portion; and receiving a selection corresponding to an option and performing any actions associated with the option when the parsed email or message data includes an executable portion.

13. The system of claim 12, wherein when the email or message data includes an executable portion including anything that would interact with a remote location, the executable portion is not loaded, and an option to load the executable portion is presented.

14. The system of claim 12, wherein when the email or message data includes an executable portion including anything that would interact with a remote location, the executable portion is automatically loaded.

15. The system of claim 12, wherein the indication is a message including an option to request a presentation of the executable portion.

16. The system of claim 15, wherein when a presentation of the executable portion is requested, the option is removed from the message.

17. The system of claim 12, wherein the indication is a message that blocks the presentation until an option is selected.

18. The system of claim 12, wherein the indication is an audio message or a video message.

19. The system of claim 12, wherein data corresponding to the selection is saved.

20. The system of claim 12, wherein parsing includes determining whether the email or message data is unsolicited, wherein when the email or message data is unsolicited, an interactive graphic is displayed.

21. The system of claim 20, wherein determinations are stored, and wherein activating the interactive graphic changes the stored determinations.

22. The system of claim 21, wherein stored determinations are undone.

23. A computer-program product, tangibly embodied in a non-transitory machine-readable storage medium, including instructions configured to cause a data processing apparatus to:
receive email or message data including a non-executable portion and an executable portion;
use latent semantic analysis to divide the email or message data into two categories, wherein email or message data in a first category is fully rendered, and wherein email or message data in a second category is partially rendered;

parse the email or message data in the second category, wherein email parsing includes searching the email or message data for anything that would interact with a remote location and determining whether the email or message data includes an executable portion, wherein an executable portion interacts with a sender of the email or message data, and wherein an executable portion includes one or more parameters capable of encoding the identity of a recipient;

present the parsed email or message data, wherein only the non-executable portion is presented to a recipient and the identity of the recipient is not revealed to the sender, and wherein when the parsed email or message data includes an executable portion, the presentation includes an indication that the email or message data includes an executable portion, and one or more options specifying one or more actions corresponding to the executable portion; and receive a selection corresponding to an option and performing any actions associated with the option when the parsed email or message data includes an executable portion.

24. The computer-program product of claim 23, wherein when the email or message data includes an executable portion including anything that would interact with a remote location, the executable portion is not loaded, and an option to load the executable portion is presented.

25. The computer-program product of claim 23, wherein when the email or message data includes an executable portion including anything that would interact with a remote location, the executable portion is automatically loaded.

26. The computer-program product of claim 23, wherein the indication is a message including an option to request a presentation of the executable portion.

27. The computer-program product of claim 26, wherein when a presentation of the executable portion is requested, the option is removed from the message.

28. The computer-program product of claim 23, wherein the indication is a message that blocks the presentation until an option is selected.

29. The computer-program product of claim 23, wherein the indication is an audio message or a video message.

30. The computer-program product of claim 23, wherein data corresponding to the selection is saved.

31. The computer-program product of claim 23, wherein parsing includes determining whether the email or message data is unsolicited, wherein when the email or message data is unsolicited, an interactive graphic is displayed.

32. The computer-program product of claim 31, wherein determinations are stored, and wherein activating the interactive graphic changes the stored determinations.

33. The computer-program product of claim 32, wherein stored determinations are undone.

34. The method of claim 1, wherein the presentation is upon a wireless device.

35. The method of claim 1, wherein presenting includes determining whether one or more pre-determined conditions have been met, wherein when the one or more pre-determined conditions have been met, one or more corresponding actions are performed.

36. The method of claim 35, wherein the one or more corresponding actions include placing the email or message data in a dedicated folder.

37. The system of claim 12, wherein the presentation is upon a wireless device.

38. The system of claim 12, wherein presenting includes determining whether one or more pre-determined conditions have been met, wherein when the one or more pre-determined conditions have been met, one or more corresponding actions are performed.

39. The system of claim 38, wherein the one or more corresponding actions include placing the email or message data in a dedicated folder.

40. The computer-program product of claim 23, wherein the presentation is upon a wireless device.

41. The computer-program product of claim 23, wherein presenting includes determining whether one or more pre-determined conditions have been met, wherein when the one or more pre-determined conditions have been met, one or more corresponding actions are performed.

42. The computer-program product of claim 41, wherein the one or more corresponding actions include placing the email or message data in a dedicated folder.

43. A method, comprising:

receiving, using one or more processors, email or message data including a non-executable portion and an executable portion;

using, using the one or more processors, latent semantic analysis to divide the email or message data into two categories, wherein email or message data in a first category is fully rendered, and wherein email or message data in a second category is partially rendered;

parsing, using the one or more processors, the email or message data in the second category, wherein parsing includes determining whether the email or message data includes an executable portion, wherein an executable portion interacts with a sender of the email or message data, and wherein an executable portion includes one or more parameters capable of encoding the identity of a recipient;

presenting, using the one or more processors, the parsed email or message data, wherein only the non-executable portion is presented to a recipient and the identity of the recipient is not revealed to the sender, wherein when the parsed email or message data includes an executable portion including anything that would interact with a remote location, the executable portion is not loaded, and an indication that the email or message data includes an executable portion and an option to load the executable portion is presented; and receiving, using the one or more processors, a selection corresponding to the option and performing any actions associated with the option when the parsed email or message data includes an executable portion.

44. The method of claim 43, wherein parsing includes searching the email or message data for anything that would interact with a remote location.

45. The method of claim 43, wherein the indication is a message that blocks the presentation until the option is selected.

46. The method of claim 43, wherein the indication is an audio message or a video message.

47. The method of claim 43, wherein data corresponding to the selection is saved.

48. The method of claim 43, wherein parsing includes determining whether the email or message data is unsolicited, wherein when the email or message data is unsolicited, an interactive graphic is displayed.

49. The method of claim 48, wherein determinations are stored, and wherein activating the interactive graphic changes the stored determinations.

50. The method of claim 49, wherein stored determinations are undone.

51. The method of claim 43, wherein the presentation is upon a wireless device.

52. The method of claim 43, wherein presenting includes determining whether one or more pre-determined conditions have been met, wherein when the one or more pre-determined conditions have been met, one or more corresponding actions are performed.

53. The method of claim 52, wherein the one or more corresponding actions include placing the email or message data in a dedicated folder.

54. A system, comprising:
one or more processors;
a computer-readable storage medium containing instructions configured to cause the one or more processors to perform operations, including:
receiving email or message data including a non-executable portion and an executable portion;
using latent semantic analysis to divide the email or message data into two categories, wherein email or message data in a first category is fully rendered, and wherein email or message data in a second category is partially rendered;
parsing the email or message data in the second category, wherein parsing includes determining whether the email or message data includes an executable portion, wherein an executable portion interacts with a sender of the email or message data, and wherein an executable portion includes one or more parameters capable of encoding the identity of a recipient;
presenting the parsed email or message data, wherein only the non-executable portion is presented to a recipient and the identity of the recipient is not revealed to the sender, wherein when the parsed email or message data includes an executable portion including anything that would interact with a remote location, the executable portion is not loaded, and an indication that the email or message data includes an executable portion and an option to load the executable portion is presented; and
receiving a selection corresponding to the option and performing any actions associated with the option when the parsed email or message data includes an executable portion.

55. The system of claim 54, wherein parsing includes searching the email or message data for anything that would interact with a remote location.

56. The system of claim 54, wherein the indication is a message that blocks the presentation until the option is selected.

57. The system of claim 54, wherein the indication is an audio message or a video message.

58. The system of claim 54, wherein data corresponding to the selection is saved.

59. The system of claim 54, wherein parsing includes determining whether the email or message data is unsolicited, wherein when the email or message data is unsolicited, an interactive graphic is displayed.

60. The system of claim 59, wherein determinations are stored, and wherein activating the interactive graphic changes the stored determinations.

61. The system of claim 60, wherein stored determinations are undone.

62. The system of claim 54, wherein the presentation is upon a wireless device.

63. The system of claim 54, wherein presenting includes determining whether one or more pre-determined conditions have been met, wherein when the one or more pre-determined conditions have been met, one or more corresponding actions are performed.

64. The system of claim 63, wherein the one or more corresponding actions include placing the email or message data in a dedicated folder.

65. A computer-program product, tangibly embodied in a non-transitory machine-readable storage medium, including instructions configured to cause a data processing apparatus to:
receive email or message data including a non-executable portion and an executable portion;
use latent semantic analysis to divide the email or message data into two categories, wherein email or message data in a first category is fully rendered, and wherein email or message data in a second category is partially rendered;
parse the email or message data in the second category, wherein parsing includes determining whether the email or message data includes an executable portion, wherein an executable portion interacts with a sender of the email or message data, and wherein an executable portion includes one or more parameters capable of encoding the identity of a recipient;
present the parsed email or message data, wherein only the non-executable portion is presented to a recipient and the identity of the recipient is not revealed to the sender, wherein when the parsed email or message data includes an executable portion including anything that would interact with a remote location, the executable portion is not loaded, and an indication that the email or message data includes an executable portion and an option to load the executable portion is presented; and
receive a selection corresponding to the option and performing any actions associated with the option when the parsed email or message data includes an executable portion.

66. The computer-program product of claim 65, wherein parsing includes searching the email or message data for anything that would interact with a remote location.

67. The computer-program product of claim 65, wherein the indication is a message that blocks the presentation until the option is selected.

68. The computer-program product of claim 65, wherein the indication is an audio message or a video message.

69. The computer-program product of claim 65, wherein data corresponding to the selection is saved.

70. The computer-program product of claim 65, wherein parsing includes determining whether the email or message data is unsolicited, wherein when the email or message data is unsolicited, an interactive graphic is displayed.

71. The computer-program product of claim 70, wherein determinations are stored, and wherein activating the interactive graphic changes the stored determinations.

72. The computer-program product of claim 71, wherein stored determinations are undone.

73. The computer-program product of claim 65, wherein the presentation is upon a wireless device.

74. The system of claim 65, wherein presenting includes determining whether one or more pre-determined conditions have been met, wherein when the one or more pre-determined conditions have been met, one or more corresponding actions are performed.

75. The system of claim 74, wherein the one or more corresponding actions include placing the email or message data in a dedicated folder.

76. A method, comprising:
- receiving, using one or more processors, email or message data including a non-executable portion and an executable portion;
- using, using the one or more processors, latent semantic analysis to divide the email or message data into two categories, wherein email or message data in a first category is fully rendered, and wherein email or message data in a second category is partially rendered;
- parsing, using the one or more processors, the email or message data in the second category, wherein parsing includes determining whether the email or message data includes an executable portion, wherein an executable portion interacts with a sender of the email or message data, and wherein an executable portion includes one or more parameters capable of encoding the identity of a recipient; and
- presenting, using the one or more processors, the parsed email or message data, wherein only the non-executable portion is presented to a recipient and the identity of the recipient is not revealed to the sender, and wherein when the parsed email or message data includes an executable portion including anything that would interact with a remote location, the executable portion is automatically loaded.

77. The method of claim 76, wherein parsing includes searching the email or message data for anything that would interact with a remote location.

78. The method of claim 76, wherein parsing includes determining whether the email or message data is unsolicited, wherein when the email or message data is unsolicited, an interactive graphic is displayed.

79. The method of claim 78, wherein determinations are stored, and wherein activating the interactive graphic changes the stored determinations.

80. The method of claim 79, wherein stored determinations are undone.

81. The method of claim 76, wherein the presentation is upon a wireless device.

82. The method of claim 76, wherein presenting includes determining whether one or more pre-determined conditions have been met, wherein when the one or more pre-determined conditions have been met, one or more corresponding actions are performed.

83. The method of claim 82, wherein the one or more corresponding actions include placing the email or message data in a dedicated folder.

84. A system, comprising:
- one or more processors;
- a computer-readable storage medium containing instructions configured to cause the one or more processors to perform operations, including:
- receiving email or message data including a non-executable portion and an executable portion;
- using latent semantic analysis to divide the email or message data into two categories, wherein email or message data in a first category is fully rendered, and wherein email or message data in a second category is partially rendered;
- parsing the email or message data in the second category, wherein parsing includes determining whether the email or message data includes an executable portion, wherein an executable portion interacts with a sender of the email or message data, and wherein an executable portion includes one or more parameters capable of encoding the identity of a recipient; and
- presenting the parsed email or message data, wherein only the non-executable portion is presented to a recipient and the identity of the recipient is not revealed to the sender, and wherein when the parsed email or message data includes an executable portion including anything that would interact with a remote location, the executable portion is automatically loaded.

85. The system of claim 84, wherein parsing includes searching the email or message data for anything that would interact with a remote location.

86. The system of claim 84, wherein parsing includes determining whether the email or message data is unsolicited, wherein when the email or message data is unsolicited, an interactive graphic is displayed.

87. The system of claim 86, wherein determinations are stored, and wherein activating the interactive graphic changes the stored determinations.

88. The system of claim 87, wherein stored determinations are undone.

89. The system of claim 84, wherein the presentation is upon a wireless device.

90. The system of claim 84, wherein presenting includes determining whether one or more pre-determined conditions have been met, wherein when the one or more pre-determined conditions have been met, one or more corresponding actions are performed.

91. The system of claim 90, wherein the one or more corresponding actions include placing the email or message data in a dedicated folder.

92. A computer-program product, tangibly embodied in a non-transitory machine-readable storage medium, including instructions configured to cause a data processing apparatus to:
- receive email or message data including a non-executable portion and an executable portion;
- use latent semantic analysis to divide the email or message data into two categories, wherein email or message data in a first category is fully rendered, and wherein email or message data in a second category is partially rendered;
- parse the email or message data in the second category, wherein parsing includes determining whether the email or message data includes an executable portion, wherein an executable portion interacts with a sender of the email or message data, and wherein an executable portion includes one or more parameters capable of encoding the identity of a recipient; and
- present the parsed email or message data, wherein only the non-executable portion is presented to a recipient and the identity of the recipient is not revealed to the sender, and wherein when the parsed email or message data includes an executable portion including anything that would interact with a remote location, the executable portion is automatically loaded.

93. The computer-program product of claim 92, wherein parsing includes searching the email or message data for anything that would interact with a remote location.

94. The computer-program product of claim 92, wherein parsing includes determining whether the email or message data is unsolicited, wherein when the email or message data is unsolicited, an interactive graphic is displayed.

95. The computer-program product of claim 94, wherein determinations are stored, and wherein activating the interactive graphic changes the stored determinations.

96. The computer-program product of claim 95, wherein stored determinations are undone.

97. The computer-program product of claim 92, wherein the presentation is upon a wireless device.

98. The computer-program product of claim 92, wherein presenting includes determining whether one or more pre-determined conditions have been met, wherein when the one or more pre-determined conditions have been met, one or more corresponding actions are performed.

99. The computer-program product of claim 98, wherein the one or more corresponding actions include placing the email or message data in a dedicated folder.

* * * * *